US007931328B2

(12) United States Patent
Lewallen et al.

(10) Patent No.: US 7,931,328 B2
(45) Date of Patent: *Apr. 26, 2011

(54) SIDEWALL OF A TRAILER INCLUDING A LOGISTICS PANEL

(75) Inventors: Wilfred E. Lewallen, Pine Villiage, IN (US); Michael L. Thoma, Lafayette, IN (US); Danny L. Gilbert, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,594

(22) Filed: Jun. 21, 2010

(65) Prior Publication Data

US 2010/0259068 A1  Oct. 14, 2010

Related U.S. Application Data

(62) Division of application No. 12/429,384, filed on Apr. 24, 2009, now Pat. No. 7,762,618, which is a division of application No. 11/856,272, filed on Sep. 17, 2007, now Pat. No. 7,588,286.

(60) Provisional application No. 60/866,649, filed on Nov. 21, 2006.

(51) Int. Cl.
*B60J 5/00* (2006.01)
(52) U.S. Cl. .................................................. 296/186.1
(58) Field of Classification Search .............. 296/186.1, 296/181.3, 181.6, 181.1, 191, 29; 29/428, 29/897.2; 52/270, 309.11, 794.1
See application file for complete search history.

(56) References Cited

U.S. PATENT DOCUMENTS

| 2,172,571 | A | 9/1939 | Theriault |
| 2,283,574 | A | 5/1942 | Pillsbury |
| 2,384,965 | A | 9/1945 | Reid |
| 3,126,224 | A | 3/1964 | Carter, Jr. et al. |
| 3,301,732 | A | 1/1967 | Kunz |
| 3,393,920 | A | 7/1968 | Ehrlich |
| 3,421,453 | A | 1/1969 | Williams |
| 3,585,942 | A | 6/1971 | Shaver |
| 3,842,755 | A | 10/1974 | Carr |
| 3,853,071 | A | 12/1974 | Snyder et al. |
| 4,015,876 | A | 4/1977 | Hulverson |
| 4,063,393 | A | 12/1977 | Toti |
| 4,122,966 | A | 10/1978 | Anderson |
| 4,212,405 | A | 7/1980 | Schmidt |
| 4,420,183 | A | 12/1983 | Sherman |
| 4,428,454 | A | 1/1984 | Capaul et al. |
| 4,437,699 | A | 3/1984 | Lewis |
| 4,455,803 | A | 6/1984 | Kornberger |

(Continued)

FOREIGN PATENT DOCUMENTS

CA  2264311  3/1998

(Continued)

*Primary Examiner* — Kiran B. Patel

(57) ABSTRACT

A logistics panel includes a composite panel that is formed of inner and outer skins and a core member secured therebetween. The composite panel has top and bottom end portions and first and second side end portions. The composite panel further has an aperture set provided therethrough which defines at least one aperture which extends through the inner and outer skins and the core member and between the end portions. Multiple logistics panels can be used to form a sidewall of a trailer by joining the first side end portion of one panel to the second side end portion of an adjacent panel. Top and bottom rails are secured to the top and bottom end portions, respectively, of the panels.

13 Claims, 28 Drawing Sheets

U.S. PATENT DOCUMENTS

| | | | |
|---|---|---|---|
| 4,455,807 A | 6/1984 | Ehrlich | |
| 4,486,994 A | 12/1984 | Fisher | |
| 4,498,264 A | 2/1985 | McCafferty et al. | |
| 4,685,721 A | 8/1987 | Banerjea | |
| 4,810,027 A | 3/1989 | Ehrlich | |
| 4,940,279 A | 7/1990 | Abott et al. | |
| 4,958,472 A | 9/1990 | Ehrlich | |
| 5,030,488 A | 7/1991 | Sobolev | |
| 5,058,756 A | 10/1991 | Green | |
| 5,059,855 A | 10/1991 | Irisawa et al. | |
| 5,066,066 A | 11/1991 | Yurgevich | |
| 5,112,099 A | 5/1992 | Yurgevich | |
| 5,150,944 A | 9/1992 | Yoshida et al. | |
| 5,195,800 A * | 3/1993 | Stafford et al. | 296/186.1 |
| 5,286,079 A | 2/1994 | Zubko | |
| 5,348,176 A | 9/1994 | Yurgevich | |
| 5,366,332 A | 11/1994 | Murphy | |
| 5,433,501 A | 7/1995 | Thomas et al. | |
| 5,439,266 A | 8/1995 | Ehrlich | |
| 5,472,290 A | 12/1995 | Hulls | |
| 5,507,405 A | 4/1996 | Thomas et al. | |
| 5,509,714 A | 4/1996 | Schmidt | |
| 5,583,321 A | 12/1996 | DiStefano et al. | |
| 5,584,252 A | 12/1996 | Smith et al. | |
| 5,664,826 A * | 9/1997 | Wilkens | 296/186.1 |
| 5,678,715 A | 10/1997 | Sjostedt et al. | |
| 5,700,118 A * | 12/1997 | Bennett et al. | 410/113 |
| 5,702,151 A | 12/1997 | Grote et al. | |
| 5,741,042 A | 4/1998 | Livingston et al. | |
| 5,752,791 A | 5/1998 | Ehrlich | |
| 5,794,402 A | 8/1998 | Dumlao et al. | |
| 5,860,693 A * | 1/1999 | Ehrlich | 296/191 |
| 5,876,089 A | 3/1999 | Ehrlich | |
| 5,934,742 A | 8/1999 | Fenton et al. | |
| 5,938,274 A | 8/1999 | Ehrlich | |
| 5,992,117 A * | 11/1999 | Schmidt | 52/582.1 |
| 5,997,076 A * | 12/1999 | Ehrlich | 296/186.1 |
| 6,003,932 A | 12/1999 | Banerjea | |
| 6,010,020 A | 1/2000 | Abal | |
| 6,023,806 A | 2/2000 | Dumlao et al. | |
| 6,106,205 A | 8/2000 | Haire | |
| 6,199,939 B1 | 3/2001 | Ehrlich | |
| 6,220,651 B1 | 4/2001 | Ehrlich | |
| 6,394,537 B1 | 5/2002 | DeRees | |
| 6,412,854 B2 | 7/2002 | Ehrlich | |
| 6,450,564 B1 | 9/2002 | Sill | |
| 6,527,335 B1 | 3/2003 | Yurgevich | |
| 6,578,902 B2 * | 6/2003 | Sill | 296/186.1 |
| 6,626,622 B2 | 9/2003 | Zubko | |
| 6,652,019 B1 | 11/2003 | Bennett | |
| 6,773,215 B2 | 8/2004 | Cuva | |
| 6,866,330 B2 | 3/2005 | Jones et al. | |
| 6,893,075 B2 | 5/2005 | Fenton | |
| 6,979,051 B2 * | 12/2005 | Jones et al. | 296/186.1 |
| 6,986,546 B2 | 1/2006 | Ehrlich | |
| 7,014,253 B2 * | 3/2006 | Oren | 296/186.1 |
| 7,069,702 B2 * | 7/2006 | Ehrlich | 52/588.1 |
| 7,100,971 B2 * | 9/2006 | Pines | 296/186.1 |
| 7,114,762 B2 * | 10/2006 | Smidler | 296/186.1 |
| 7,134,820 B2 * | 11/2006 | Ehrlich | 410/150 |
| 7,152,912 B1 | 12/2006 | Roush | |
| 7,461,888 B2 * | 12/2008 | Brown | 296/186.1 |
| 7,500,713 B2 | 3/2009 | Riley et al. | |
| 7,527,325 B2 * | 5/2009 | Yurgevich | 296/186.1 |
| 7,540,085 B2 * | 6/2009 | Fenton et al. | 29/897.32 |
| 7,588,286 B2 | 9/2009 | Lewallen et al. | |
| 7,704,026 B2 * | 4/2010 | Roush et al. | 410/115 |
| 7,762,618 B2 | 7/2010 | Lewallen et al. | |
| 2001/0024055 A1 | 9/2001 | Ehrlich | |
| 2002/0109377 A1 | 8/2002 | Ehrlich | |
| 2002/0180238 A1 | 12/2002 | Sill | |
| 2004/0217631 A1 | 11/2004 | Ehrlich | |
| 2004/0232728 A1 | 11/2004 | Smidler | |
| 2004/0239147 A1 | 12/2004 | Fenton | |
| 2005/0161977 A1 | 7/2005 | Fenton | |
| 2006/0028050 A1 | 2/2006 | Ehrlich | |
| 2006/0043771 A1 | 3/2006 | Ehrlich | |
| 2006/0237993 A1 | 10/2006 | Wiebe | |
| 2007/0110538 A1 | 5/2007 | Roush et al. | |
| 2008/0111393 A1 | 5/2008 | Ehrlich | |
| 2008/0134509 A1 | 6/2008 | Lewallen et al. | |
| 2008/0211262 A1 * | 9/2008 | Wylezinski | 296/186.1 |
| 2009/0026215 A1 | 1/2009 | Roush | |
| 2009/0206631 A1 | 8/2009 | Lewallen et al. | |
| 2010/0089917 A1 * | 4/2010 | Gilbert et al. | 220/6 |

FOREIGN PATENT DOCUMENTS

| | | |
|---|---|---|
| CA | 2551863 | 3/1998 |
| CA | 2265405 | 3/1999 |
| CA | 2531934 | 1/2000 |
| EP | 0607575 A1 | 7/1994 |
| GB | 2158931 | 11/1985 |
| SU | 1627443 A1 | 2/1991 |

* cited by examiner

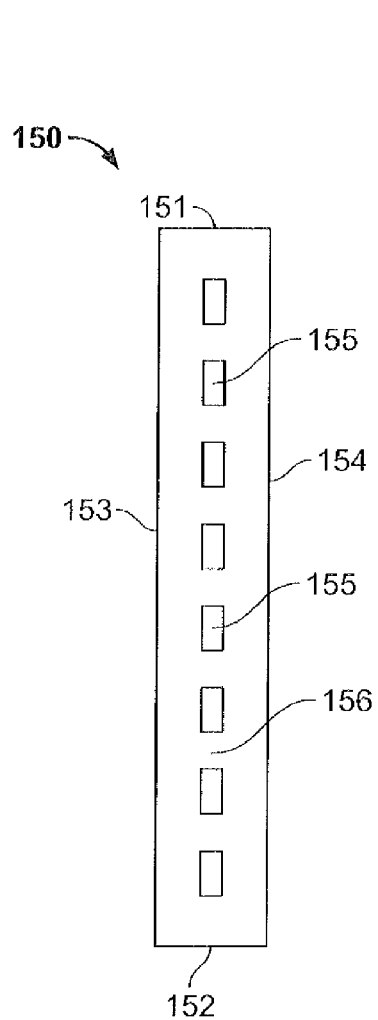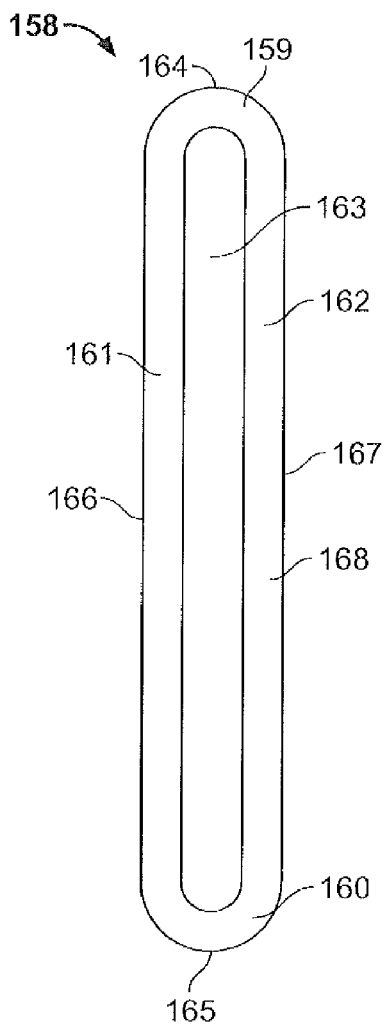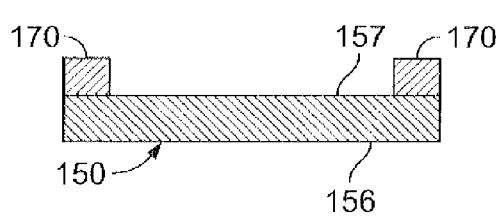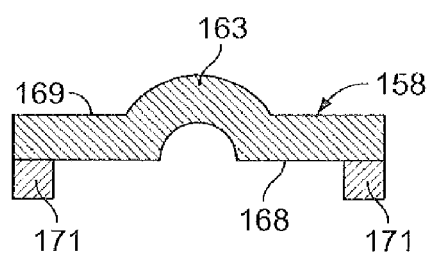
FIG. 8
FIG. 9
FIG. 10
FIG. 11

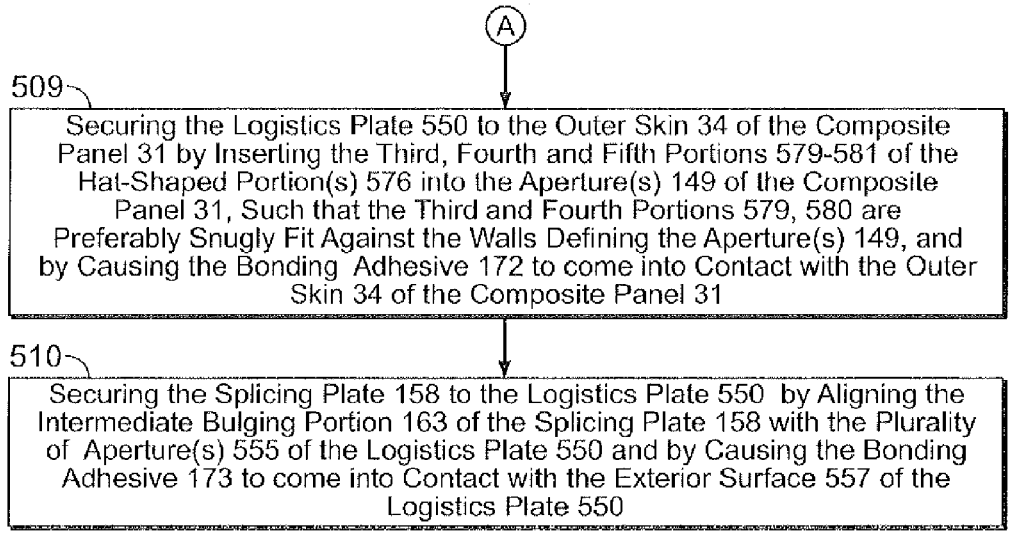
FIG. 22B
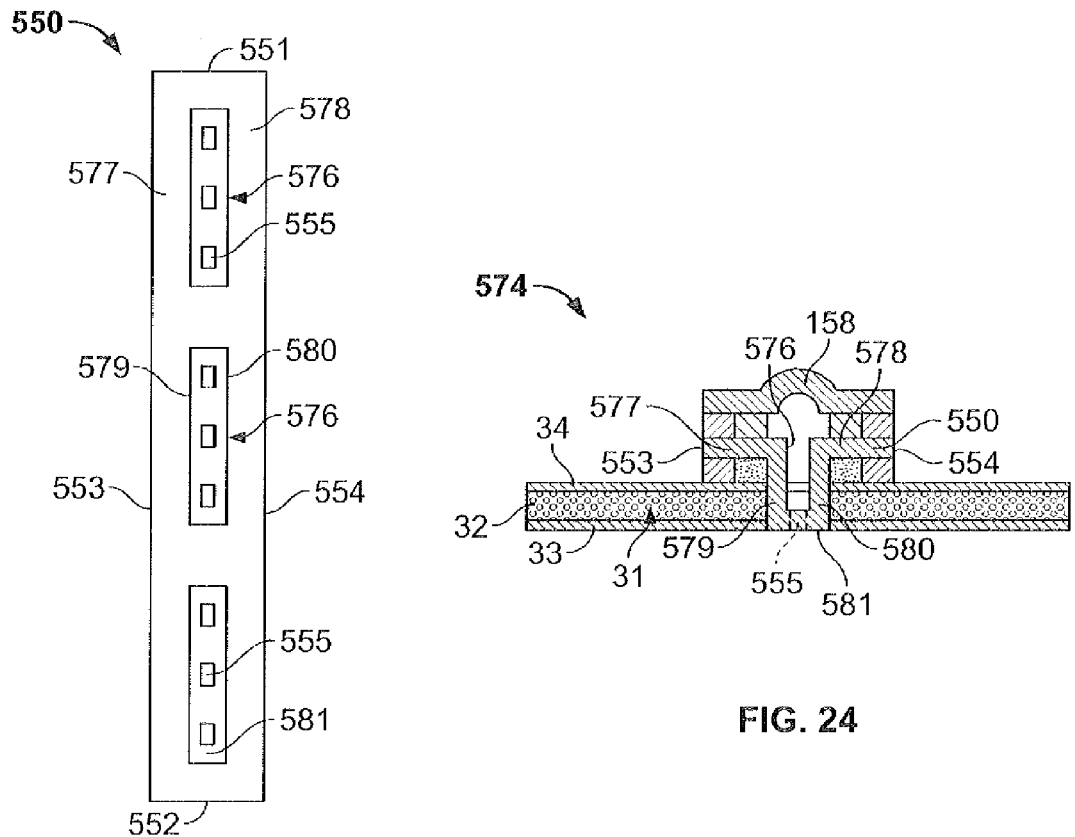
FIG. 23
FIG. 24

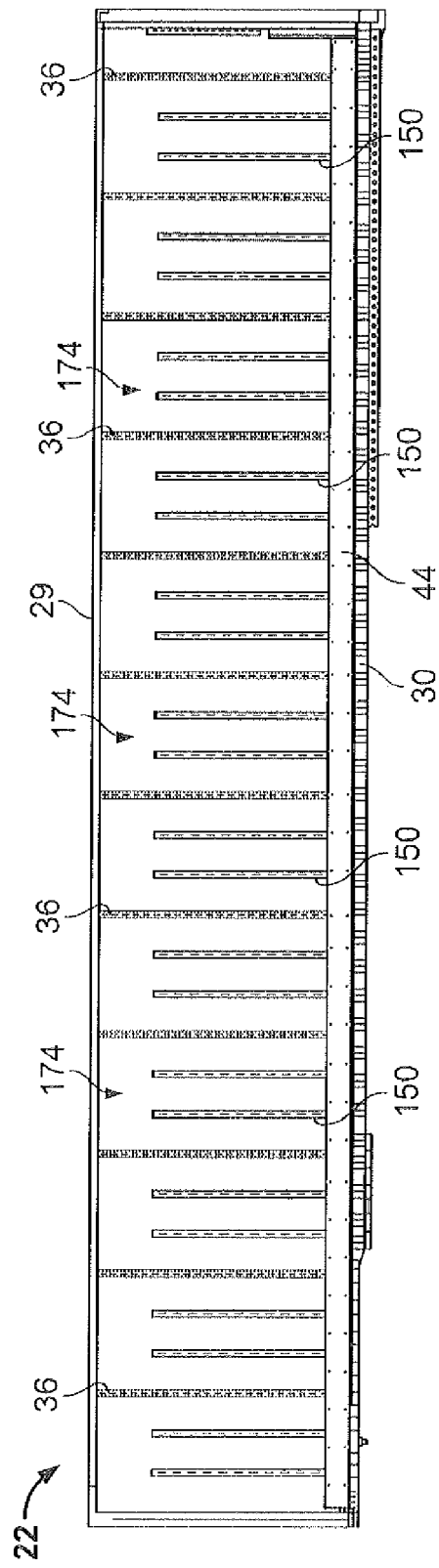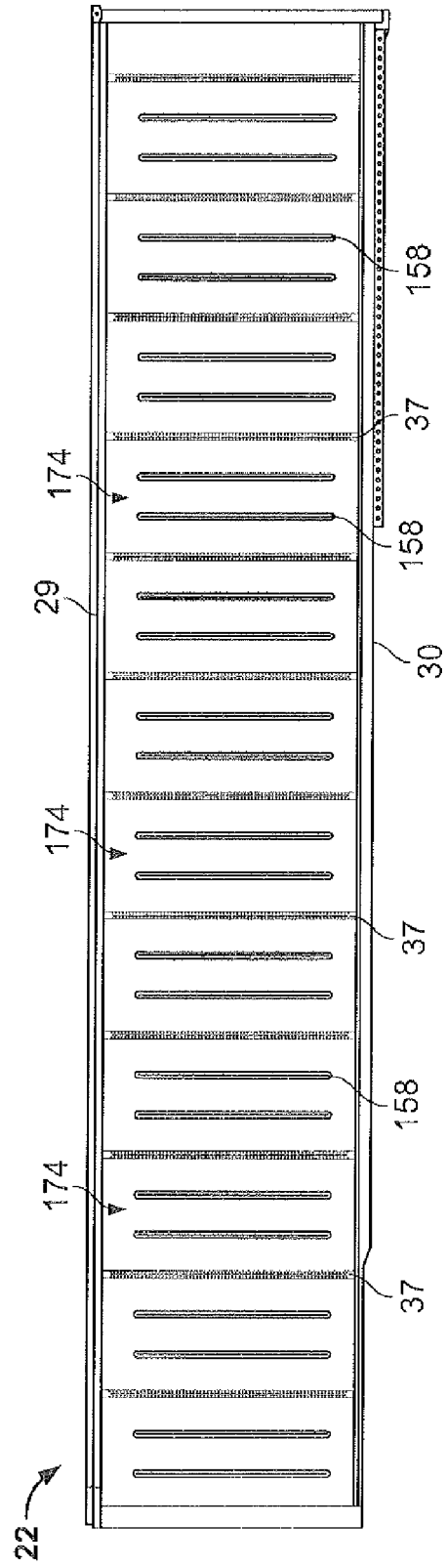

SIDEWALL OF A TRAILER INCLUDING A LOGISTICS PANEL

CROSS-REFERENCE AND INCORPORATION BY REFERENCE

This application is a divisional of U.S. application Ser. No. 12/429,384, filed Apr. 24, 2009 now U.S. Pat. No. 7,762,618, and entitled "Logistics Panel for Use in a Sidewall of a Trailer," which is a divisional of U.S. application Ser. No. 11/856,272, filed on Sep. 17, 2007 now U.S. Pat No. 7,588,286, and entitled "Logistics Panel For Use In A Sidewall Of A Trailer" which, in turn, claims the domestic priority of U.S. Provisional Application Ser. No. 60/866,649, filed on Nov. 21, 2006, and entitled "Logistics Panel And Method Of Forming Same." The entirety of each of the aforementioned applications is hereby incorporated by reference herein.

FIELD OF THE INVENTION

The invention generally relates to sidewalls for trailers. More specifically, the invention relates to composite panels for use in forming sidewalls for trailers, where the composite panels have logistics apertures provided therethrough at positions other than where adjacent composite panels are joined together.

BACKGROUND OF THE INVENTION

A prior art semi-trailer 20 is shown in FIGS. 1 and 2. The semi-trailer 20 can be connected to a tractor 45 by conventional means, such as a fifth wheel assembly (not shown). The semi-trailer 20 includes a body 21 formed from a pair of rectangular sidewalls 22, a front wall 23, rear doors 24, a top panel or roof 25, and a bottom panel or floor 26. The floor 26 is supported by a conventional rear undercarriage assembly 27 and has a landing gear 28 secured thereunder. The roof 25 and an upper portion of the sidewalls 22 are secured to a top rail 29. The floor 26 and a lower portion of the sidewalls 22 are secured to a bottom rail 30.

Each sidewall 22 includes a plurality of vertical upstanding composite panels 31. Each composite panel 31 includes a core member 32 sandwiched between an inner skin 33 and an outer skin 34 and bonded thereto by a suitable known adhesive or other like means. Each composite panel 31 preferably has a thickness of approximately 0.295 inches.

The skins 33, 34 are preferably made of aluminum, galvanized, full hardened steel, such as AISI Grade E full hard steel because of its cost effectiveness, or the like. Preferably, the inner and outer skins 33, 34 are made of galvanized steel. Aluminum may be used, but it may be too soft for some purposes and strength and punch resistance are sacrificed, however, aluminum is lightweight.

Each core member 32 is made of some type of compressible non-metal material, preferably thermoplastic, such as polypropylene or high density polyethylene. These materials are relatively inexpensive as compared to aluminum found in prior semi-trailer wall constructions. In addition, because a composite panel 31 is used, the weight of the semi-trailer construction is reduced over semi-trailers having aluminum sidewalls.

Each composite panel 31 preferably has a width of forty-eight inches from a first side end thereof to an opposite side end thereof, but it is to be understood that the composite panels 31 can have a width which is longer or shorter. As shown, end portions 38, 39 of each composite panel 31 are coined or stepped to reduce the thickness of the composite panels 31 at their end portions 38, 39. The end portions 38, 39 are not always stepped or coined in the prior art. Each end portion 38, 39 of each composite panel 31 preferably is approximately 1.3 inches wide and has a thickness of approximately 0.215 inches such that the end portions 38, 39 are preferably coined or stepped by approximately 0.080 inches. Each composite panel 31 also has a height defined from a top end 46 thereof to a bottom end 47 thereof.

The composite panels 31 are joined together by a joint configuration 35, preferably of the type disclosed in any one of U.S. Pat. Nos. 4,958,472, 5,860,693, 5,997,076, 6,220,651, 6,412,854, and 6,986,546, all of which are owned by the assignee of the present application, and which are each hereby incorporated by reference in their entireties. Typically, the joint configuration 35 includes an interior post or logistics member 36 and an exterior post or splicing member 37.

The interior post 36 is an elongated member which is secured to the inner skins 33 of adjacent composite panels 31 at the end portions 38, 39 thereof. The interior post 36 joins the adjacent composite panels 31 together, as well as spaces the ends of the adjacent composite panels 31 apart from one another such that a gap or air pocket 40 exists between the adjacent composite panels 31. The interior post 36 is seated against the end portions 38, 39. The interior post 36 has a plurality of apertures or slots 41 extending therethrough which are in communication with the gap 40. The apertures 41 are provided such that equipment, such as clips, hooks, or any other appropriate item, may be engaged with the apertures 41. The interior post 36 preferably has a thickness of approximately 0.074 inches.

The exterior post 37 is an elongated member which is secured to the outer skins 34 of adjacent composite panels 31 at lire end portions 38, 39. The exterior post 37 joins the adjacent composite panels 31 together, spaces the ends of the adjacent composite panels 31 apart from one another, and seals the junction between the adjacent composite panels 31 on the exterior of the trailer 20 so as to seal the interior of the trailer 20 from moisture. As shown, the exterior post 37 has an intermediate bulging portion 42 which bulges outwardly from the outer skins 34. The bulging portion 42 is aligned with the gap 40 provided between the adjacent composite panels 31, and is provided to provide for more room in the gap 40 to allow for the engagement of equipment with or through the apertures 41 of the interior post 36. The exterior post 37 preferably has a thickness of approximately 0.050 inches.

The interior and exterior posts 36, 37 are fixedly secured to the adjacent composite panels 31 by suitable means, such as rivets 43 and/or by a suitable adhesive or bonding agent (not shown). The interior and exterior posts 36, 37 preferably extend along an entire height of the adjacent composite panels 31, generally from the roof 25 to the floor 26. The bottom rail 30 may have a portion 44 thereof which extends upwardly from the floor 26 for a predetermined distance in the interior of the trailer 20. The portion 44 is generally positioned to face or abut against the inner skins 33 of the composite panels 31 and, thus, also faces or abuts against the interior post 36. The portion 44, otherwise known as a baserail, is fixedly secured to a lower portion of the adjacent composite panels 31, as well as to the interior and exterior posts 36, 37 by suitable means, such as rivets 43 and/or by a suitable adhesive or bonding agent (not shown).

It should be noted that while a specific example of the joint configuration 35 has been described and illustrated, this joint configuration 35 is merely an example. The joint configuration 35 is thus intended to generally include any joint configuration which secures adjacent composite panels 31 together in any manner. The joint configuration 35 need not even provide logistics apertures therethrough for the engagement of equipment and need not space the ends of adjacent composite panels 31 apart from one another. The end portions 38, 39 also need not be stepped or coined.

As stated above, each composite panel 31 typically has a width of four feet (48 inches) such that a distance between the apertures 41 of adjacent interior posts 36 is slightly larger than four feet, typically approximately fifty inches. Customer demand, however, has required the provision of logistics apertures, such as apertures 41 of the interior posts 36, at distances which are shorter than those provided for between adjacent composite panels 31. For instance, some customers have required that logistics apertures be provided approximately every sixteen to seventeen inches along an interior of the trailer 20, while other customers have required that logistics apertures be provided approximately every twenty-four to twenty-five inches along an interior of the trailer 20.

As manufacturers of trailers 20 have not found it cost-feasible to manufacture and store varying widths of composite panels 31, e.g., those of sixteen, twenty-four and forty-eight inches in width, manufacturers have instead cut or sheared the forty-eight inch composite panels 31 at the appropriate widths and provided the joint configurations 35 to secure the two or three cut pieces of the forty-eight inch composite panels 31 together in order to provide the logistics apertures at the desired locations along the sidewall 22 within the interior of the trailer 20. Such a trailer 20 is partially illustrated in FIGS. 3 and 4.

This solution to the customer's requirements, however, has a number of drawbacks including, but not necessarily limited to, the following drawbacks. First, the trailer 20 with all of these extra joint configurations 35 will add to the weight of the trailer 20. Second, extra apertures must be provided through the portion 44 of the bottom rail 30 in order to allow for fastening members, such as the rivets 43, to extend therethrough and secure the portion 44 to the composite panels 31 and to the interior and exterior posts 36, 37, possibly weakening the structural integrity of the bottom rail 30. Third, it costs more money to manufacture such a trailer 20 as the manufacture invariably requires increased man hours, reduced throughput, increased cost, more scrap, and more material (e.g., the amount of rivets 43 used) per trailer 20. Fourth, the appearance of the trailer 20 is not necessarily appealing and fifth, the trailer 20 may have potential leak paths which would allow moisture to enter the interior of the trailer 20.

Thus, it is desirable to provide a method of manufacturing a sidewall 22 of the trailer 20 which overcomes or minimizes these drawbacks, but which will also allow the manufacturer of the trailer 20 to meet the customer's demands/requirements. The present invention provides for such a method and such a sidewall of a trailer.

SUMMARY OF THE INVENTION

The invention provides a logistics panel having a composite panel that is formed of inner and outer skins and a core member secured therebetween. The composite panel has top and bottom end portions and first and second side end portions. The composite panel further has an aperture set is formed through the composite panel which defines at least one aperture which extends through the inner and outer skins and the core member and between the end portions. Multiple logistics panels can be used to form a sidewall of a trailer by joining the first side end portion of one panel to the second side end portion of an adjacent panel. Top and bottom rails are secured to the top and bottom end portions, respectively, of the panels.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 8 is a side view of a logistics plate used in forming the logistics panel in accordance with the first embodiment of the method;

FIG. 9 is a side view of a splicing plate used in forming the logistics panel in accordance with the first embodiment of the method;

FIG. 10 illustrates a step of applying a tape to an exterior surface of the logistics plate of FIG. 8 in accordance with the first embodiment of the method of the invention;

FIG. 11 illustrates a step of applying a tape to an interior surface of the splicing plate of FIG. 9 in accordance with the first embodiment of the method of the invention;

FIG. 23 is a side view of the logistics panel formed in accordance with the fifth embodiment of the method of the invention;

FIG. 24 illustrates the steps of securing the logistics plate to the outer skin of the composite panel, and of securing the splicing plate of FIG. 13 to the logistics plate in accordance with the fifth embodiment of the method of the invention;

FIG. 30 is a side view of an interior of a sidewall of a trailer formed in accordance with methods of the invention;

FIG. 31 is a side view of an exterior of the sidewall of the trailer formed in accordance with methods of the invention;

DESCRIPTION OF THE ILLUSTRATIVE EMBODIMENTS

Figure 1:
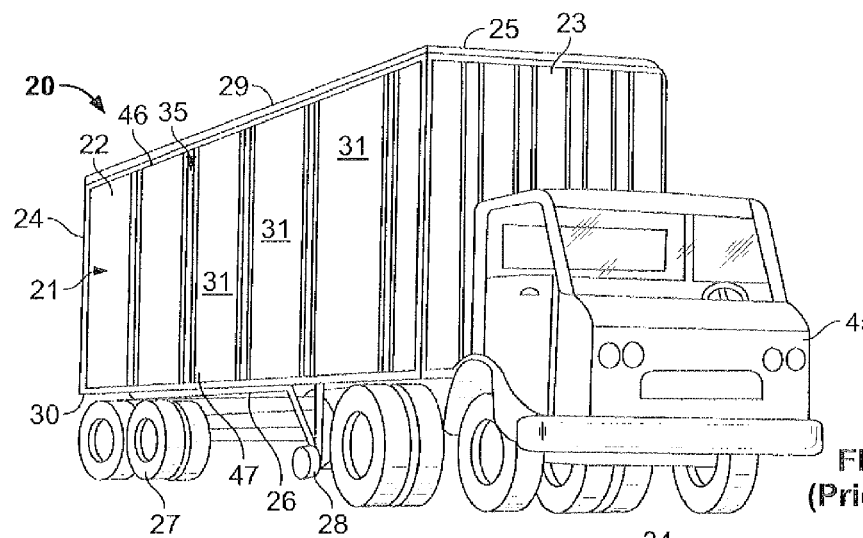
FIG. 1 is a perspective view of a prior art trailer having a plurality of joined composite panels forming the sidewalls of the trailer, with the trailer connected to a tractor.
Figure 2:
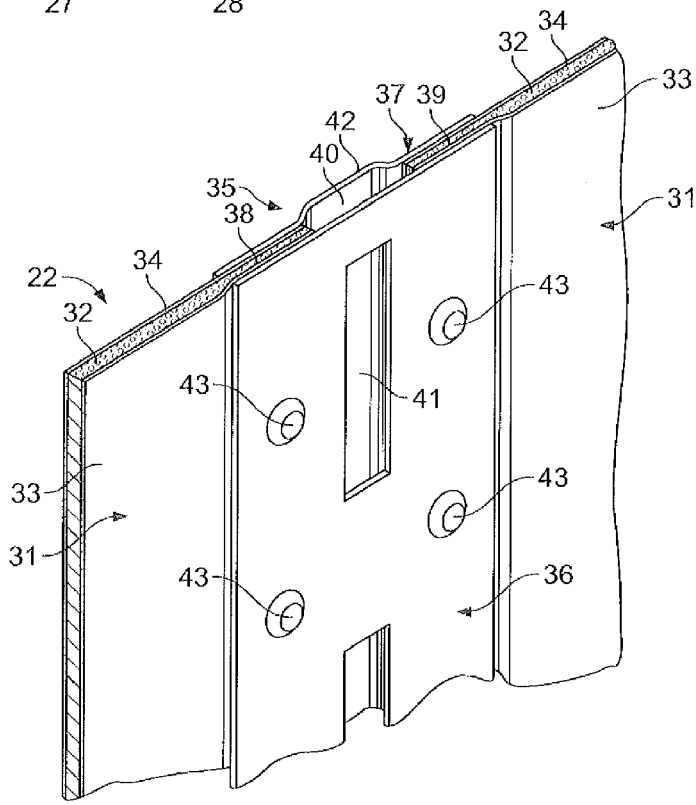
FIG. 2 is a perspective view of a prior art pair of joined composite panels used in forming a sidewall of a trailer.
Figure 3:
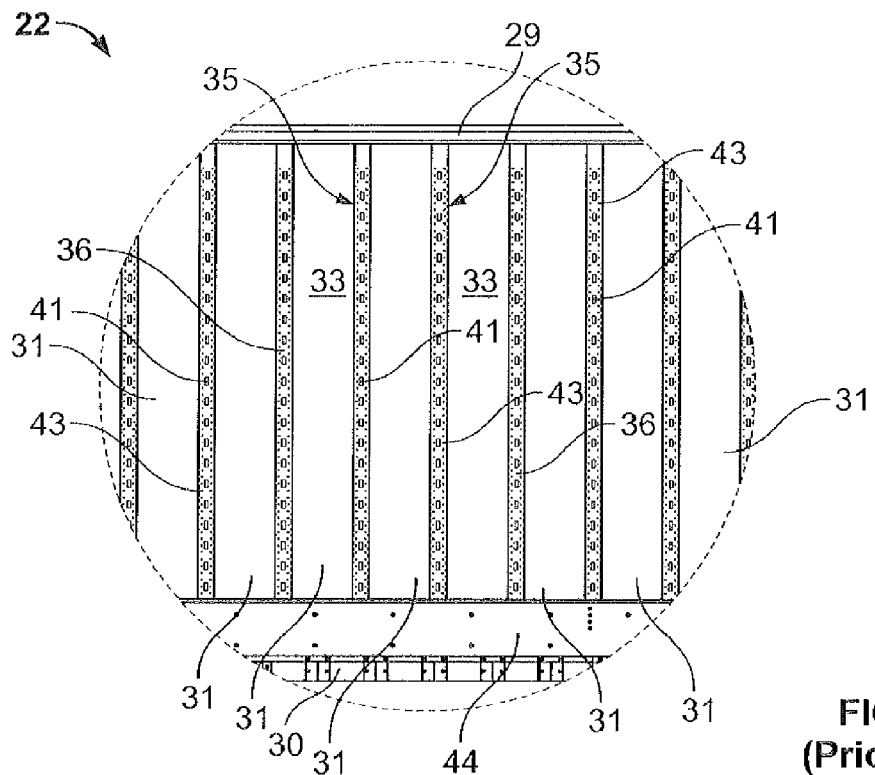
FIG. 3 is an interior side view of the prior art pair of joined composite panels used in forming the sidewall of the trailer shown in FIG. 2.
Figure 4:
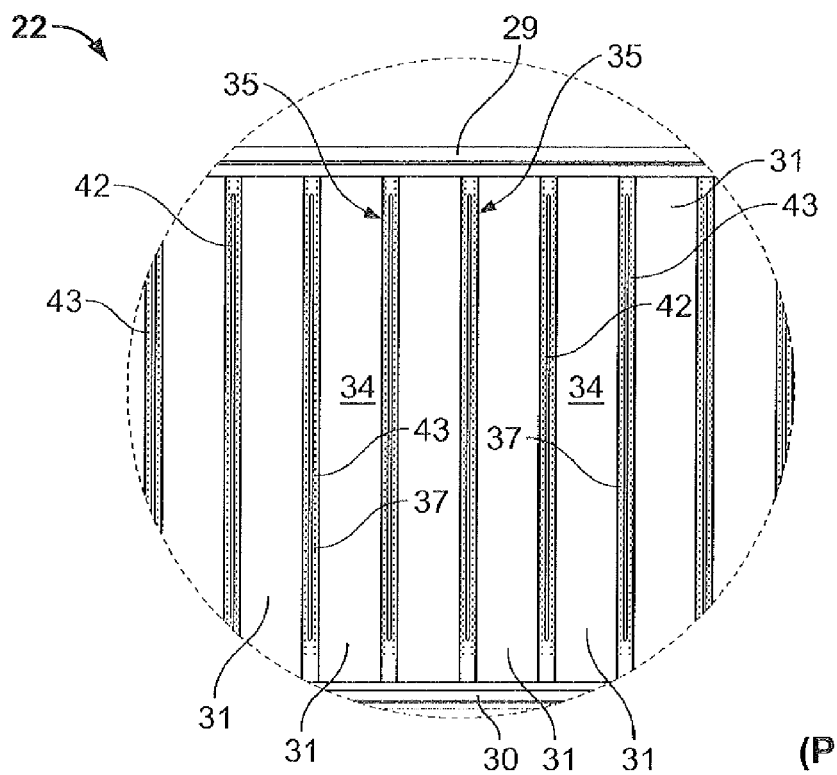
FIG. 4 is an exterior side view of the prior art pair of joined composite panels used in forming the sidewall of the trailer shown in FIG. 2.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Attention is now invited to the various methods of forming a logistics panel 174 to be used in forming a sidewall of a trailer which will meet the customer's demands/requirements, but which will also overcome the drawbacks associated with the method of forming the sidewall 22 of the trailer 20. A first embodiment of a method 100 of forming a logistics panel 174 to be used in forming a sidewall 122 of a trailer 20 is described herein and illustrated in FIGS. 5-15, 39 and 40. A second embodiment of a method 200 of forming a logistics panel 274 is described herein and illustrated in FIGS. 16 and 17. A third embodiment of a method 300 of forming a logistics panel 374 is described herein and illustrated in FIGS. 18 and 19. A fourth embodiment of a method 400 of forming a logistics panel 474 is described herein and illustrated in FIGS. 20 and 21. A fifth embodiment of a method 500 of forming a logistics panel 574 is described herein and illustrated in FIGS. 22-24. A sixth embodiment of a method 600 of forming a logistics panel 674 is described herein and illustrated in FIGS. 25 and 26. Like elements are denoted with like reference numerals with the first embodiment being in the one hundreds, the second embodiment being in the two hundreds, the third embodiment being in the three hundreds, the fourth embodiment being in the four hundreds, the fifth embodiment being in the five hundreds, and the sixth embodiment being in the six hundreds. It is to be understood that the drawings are not necessarily drawn to scale.

Figure 5:
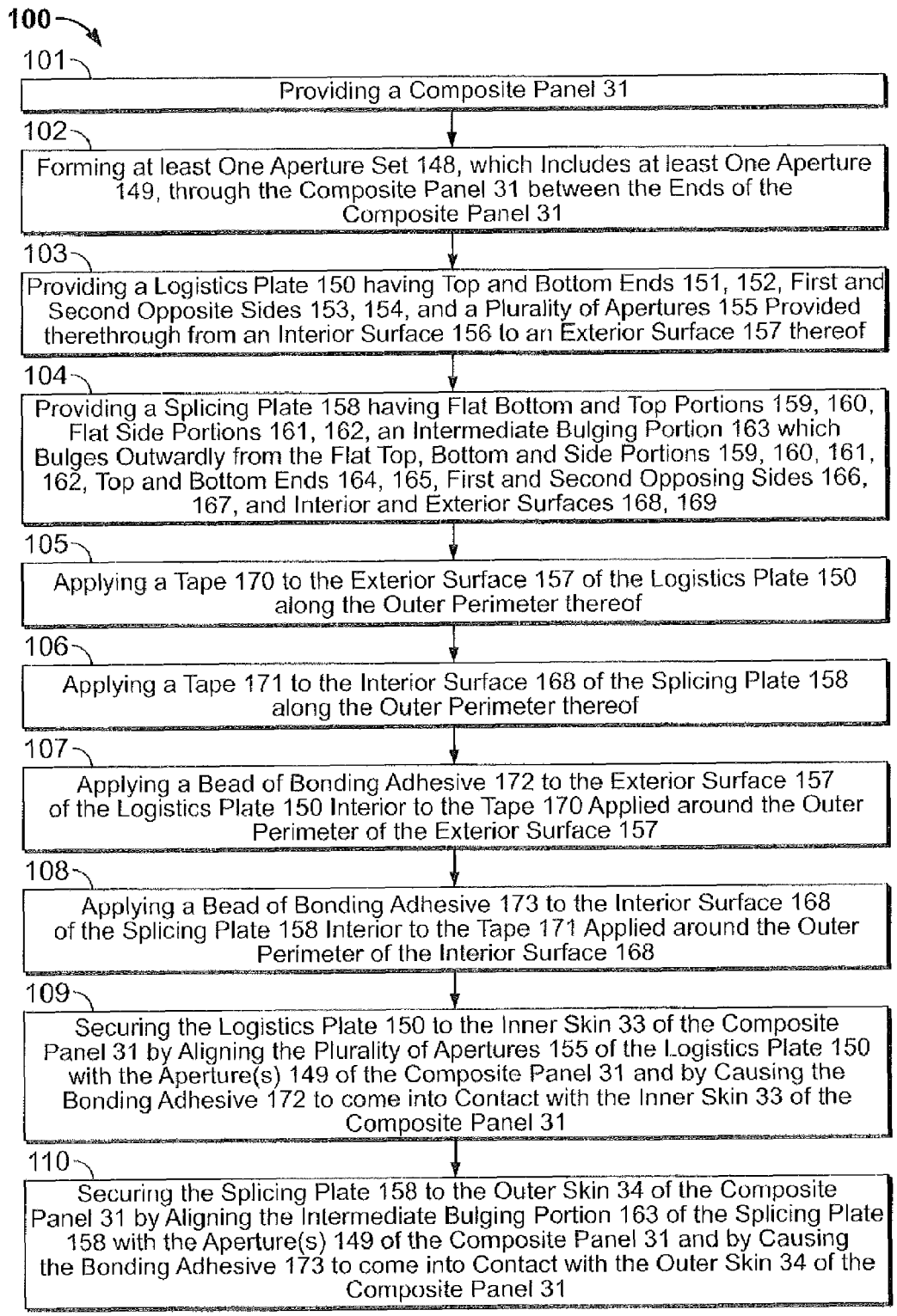
FIG. 5 is a flow chart identifying the steps of a first embodiment of a method of forming a logistics panel in accordance with the invention.
Figure 39:
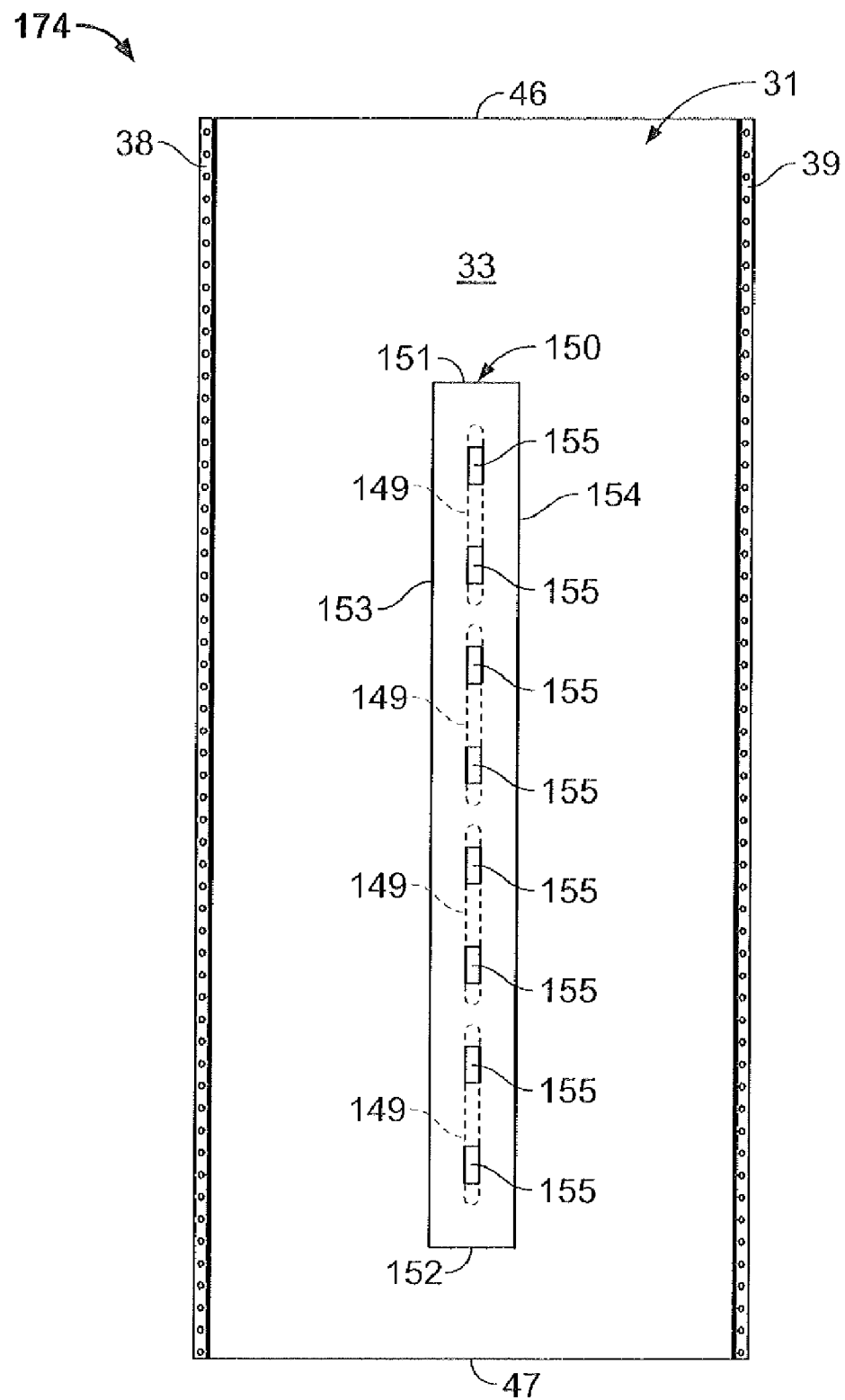
FIG. 39 illustrates an interior side view of the logistics panel formed in accordance with the first embodiment of the method described and illustrated in connection with FIGS. 5-15, with the logistics plate being secured to the inner skin of the composite panel and the logistics apertures being in communication with the apertures provided through the composite panel such that the apertures provided through the composite panel can be accessed through the logistics apertures.
Figure 40:
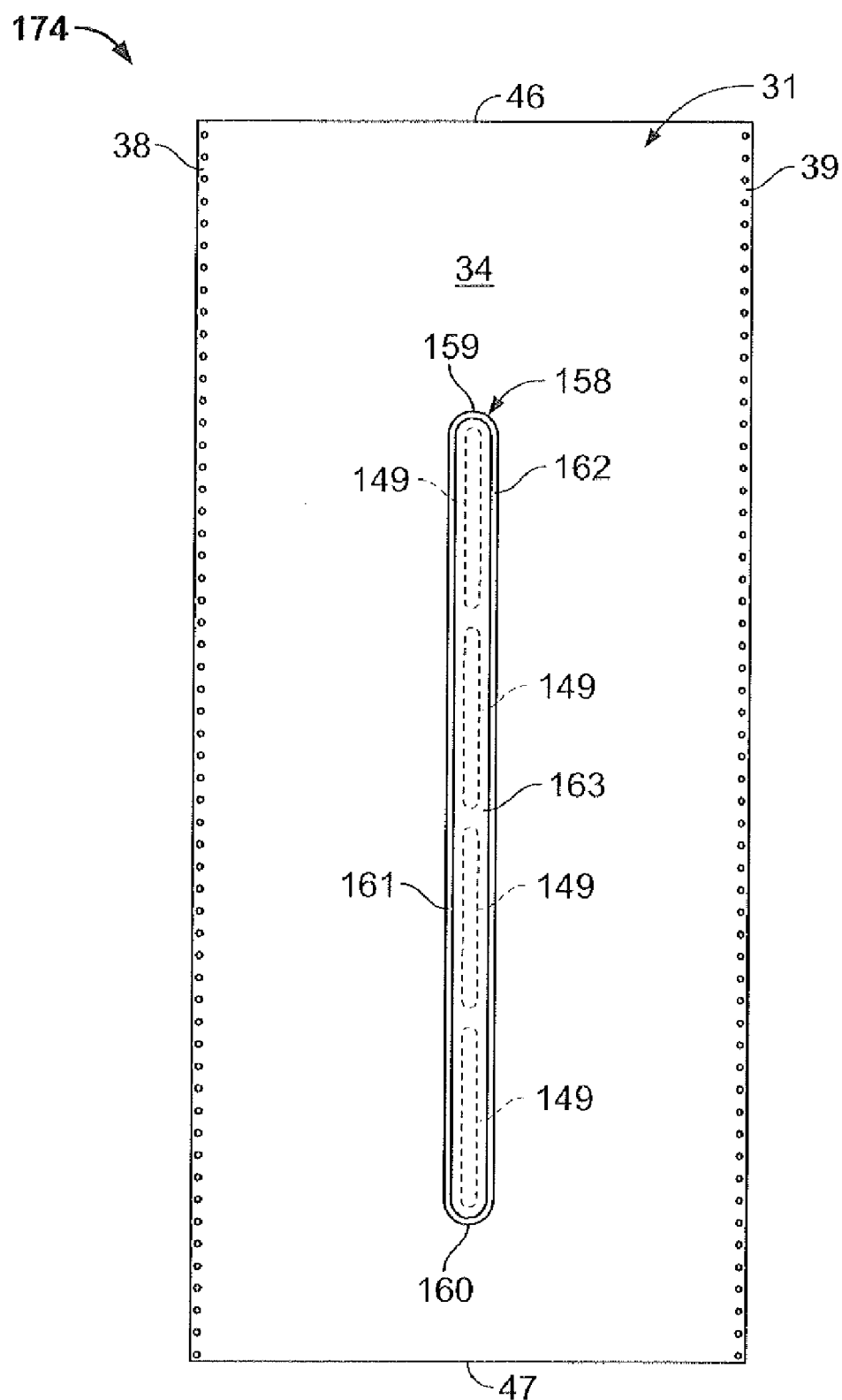
FIG. 40 illustrates an exterior side view of the logistics panel formed in accordance with the first embodiment of the method described and illustrated in connection with FIGS. 5-15, with the splicing plate being secured to the outer skin of the composite panel and the intermediate bulging portion covering the apertures provided through the composite panel such that the apertures provided through the composite panel cannot be accessed through the splicing plate.

Attention is invited to FIGS. 5-15, 39 and 40 and the first embodiment of the method 100. FIG. 5 provides a flow chart of the method 100, FIGS. 6-15 show the step-by-step formation of the logistics panel 174, and FIGS. 39 and 40 show interior and exterior views of the formed logistics panel 174.

Figure 6:
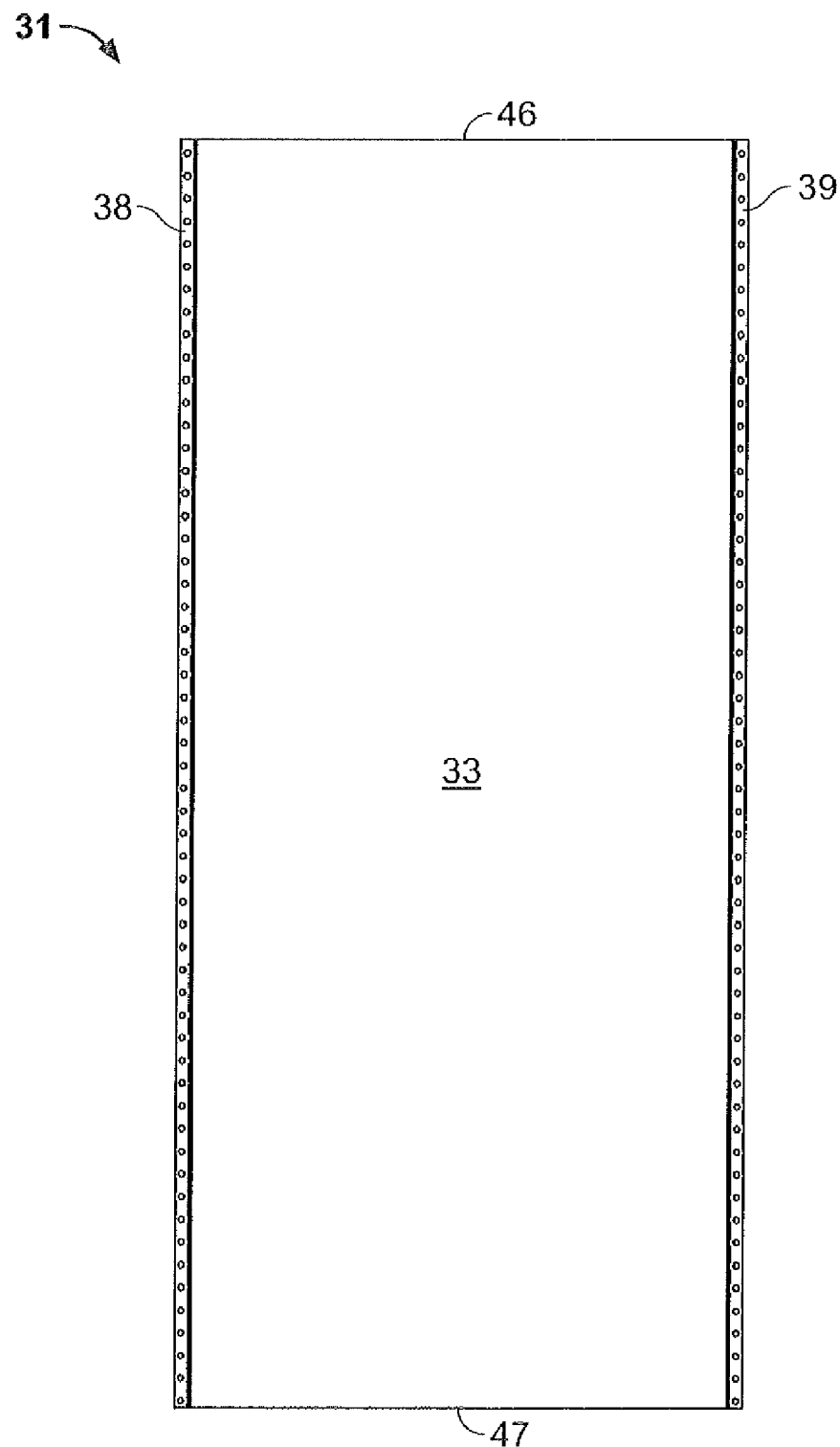
FIG. 6 is a side view of a composite panel used in forming the logistics panel in accordance with the first embodiment of the method.

First, in step 101, a composite panel 31 having inner and outer skins 33, 34 and a core member 32 provided therebetween, as illustrated in FIG. 6, is formed in a known manner.

Figure 7:
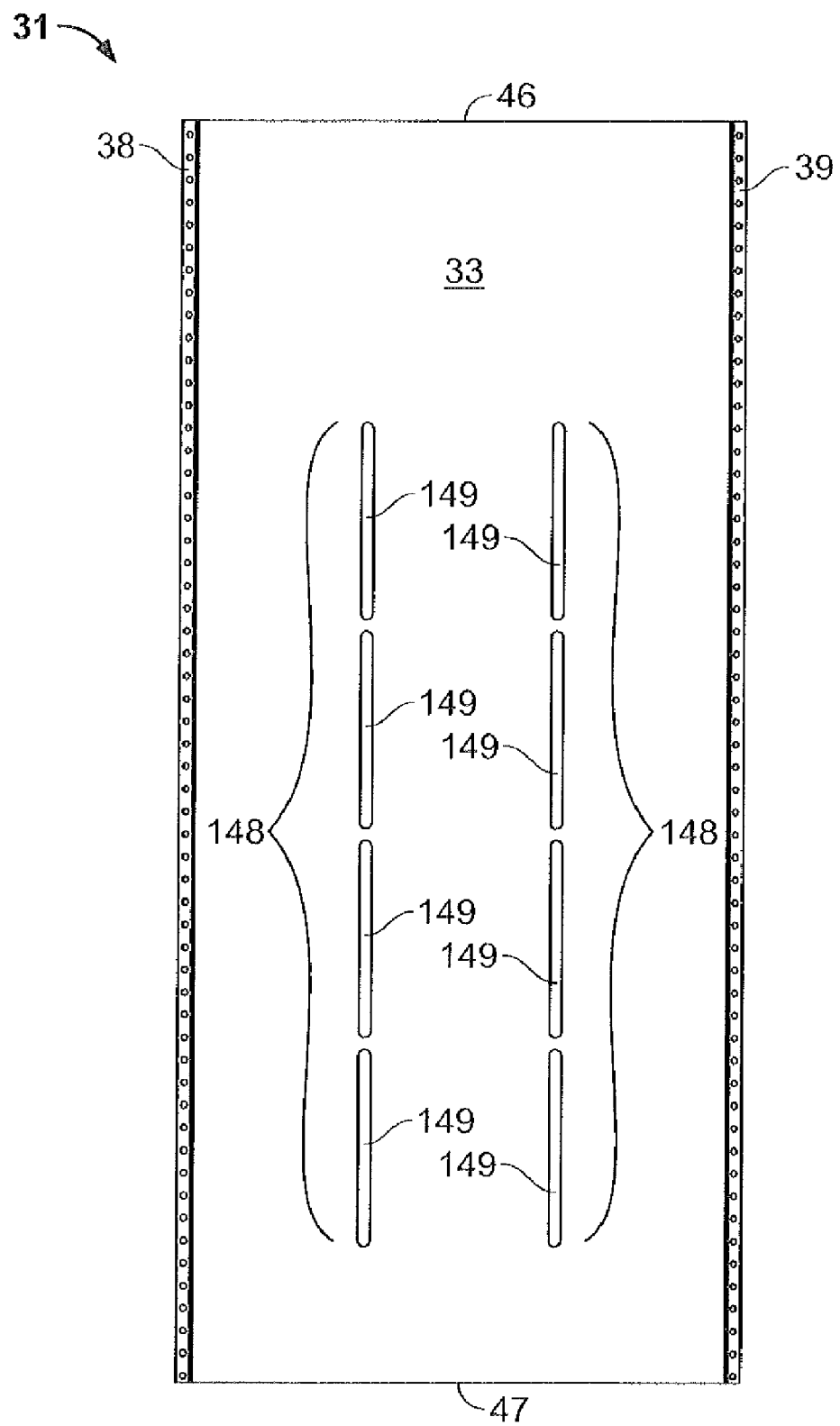
FIG. 7 illustrates a step of forming aperture sets through the composite panel of FIG. 6 in accordance with the first embodiment of the method of the invention.

In step 102, at least one aperture set 148 is formed through the composite panel 31, as desired, between the ends of the composite panel 31, as illustrated in FIG. 7. If, for example, a customer demands/requires logistics apertures every sixteen to seventeen inches along the interior of the trailer 20, two aperture sets 148 are provided, with one aperture set 148 being approximately one-third of the way between the ends of the composite panel 31 and the other aperture set 148 being approximately two-thirds of the way between the ends, as shown in FIG. 7. If, however, a customer demands/requires logistics apertures every twenty-four to twenty-five inches along the interior of the trailer 20, a single aperture set 148 would be provided generally midway between the ends of the composite panel 31. Of course, if desired, more than one or two aperture sets 148 could be provided. Each aperture set 148 may be formed through the composite panel 31 in any appropriate manner, including, but not limited to, punching or cutting. For convenience, further description of the method 100 will be described with reference to only one aperture set 148 with the understanding that where more than one aperture set 148 provided, the identical steps would be performed in connection with the other aperture set(s).

The aperture set 148 extends from a position below the top end 46 of the composite panel 31 to a position above the bottom end 47 of the composite panel 31. The position below the top end 46 of the composite panel 31 is a position which is provided at, or preferably below, where the top rail 29 of the trailer 20 will be secured to the composite panel 31. The position above the bottom end 47 of the composite panel 31 is a position which is provided at, or preferably above, where the portion 44 of the bottom rail 30 will be secured to the composite panel 31.

The aperture set 148 includes at least one aperture 149, but may include many apertures 149. For illustration purposes, FIG. 7 illustrates each aperture set 148 having four separate apertures 149. Where more than one aperture 149 is provided, the apertures 149 are separated from adjacent apertures 149 by a predetermined distance along the height of the composite panels 31. As illustrated in FIG. 7, each of the apertures 149 are preferably elongated and have rounded top and bottom ends, although this does not need to be the exact configuration of the apertures 149. The apertures 149 of each aperture set 148 are linearly arranged along the height of the composite panel 31.

In step 103, a logistics plate 150, as illustrated in FIG. 8, which is similar to the interior post 36, but which has a reduced height comparative to the interior post 36, is provided. The logistics plate 150 has top and bottom ends 151, 152, first and second opposite sides 153, 154 and a plurality of apertures 155 provided therethrough from an interior surface 156 to an exterior surface 157 thereof. The apertures 155 are the logistics apertures and are separated from one another by a predetermined distance along the height of the logistics plate 150. The plurality of apertures 155 are generally equivalent in size and shape to the plurality of apertures 41 provided through the interior post 36, but are preferably smaller in size than the aperture(s) 149 provided through the composite panels 31, for reasons which will be discussed herein. The logistics plate 150 preferably has a thickness of approximately 0.074 inches.

In step 104, a splicing plate 158, as illustrated in FIG. 9, which is similar to the exterior post 37, but which has a reduced height comparative to the exterior post 37, is provided. The splicing plate 158 has flat top and bottom portions 159, 160, flat side portions 161, 162, and an intermediate bulging portion 163 which bulges outwardly from the flat top, bottom and side portions 159, 160, 161, 162. The splicing plate 158 further includes top and bottom ends 164, 165 and first and second opposing sides 166, 167, as well as an interior surface 168 and an exterior surface 169. The splicing plate 158 preferably has a thickness of approximately 0.050 inches.

In step 105, a tape 170 is applied to the exterior surface 157 of the logistics plate 150 along the outer perimeter thereof, e.g., along the top and bottom ends 151, 152 and along the first and second sides 153, 154, as illustrated in FIG. 10. The tape 170 is preferably a PVC foam tape and has a minimal thickness, for example 0.0625 inches thick. The tape 170 is preferably not so wide as to extend all the way to the apertures 155 provided through the logistics plate 150.

In step 106, a tape 171, which is preferably the same as tape 170, is applied to the interior surface 168 of the splicing plate 158 along the outer perimeter thereof, e.g., along the top and bottom ends 164, 165 and along the first and second sides 166, 167, as illustrated in FIG. 11.

Figure 12:
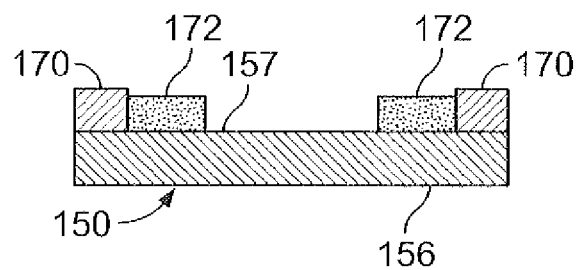
FIG. 12 illustrates a step of applying an adhesive to the exterior surface of the logistics plate of FIG. 10 in accordance with the first embodiment of the method of the invention.

In step 107, a bead of bonding adhesive 172 is applied around the outer perimeter of the exterior surface 157 of the logistics plate 150 and interior to the tape 170, as illustrated in FIG. 12. The bonding adhesive 172 may be applied continuously or may be applied at various locations on the exterior surface 157. The bonding adhesive 172 may have a thickness which is greater than, less than, or equal to the thickness of the tape 170.

Figure 13:
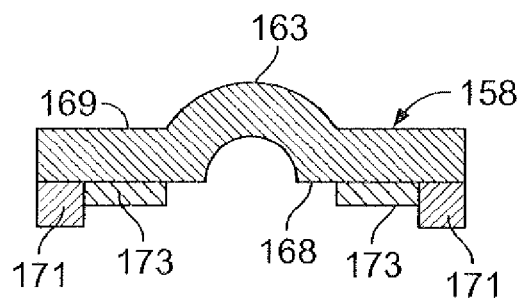
FIG. 13 illustrates a step of applying an adhesive to the interior surface of the splicing plate of FIG. 11 in accordance with the first embodiment of the method of the invention.

In step 108, a bead of bonding adhesive 173, which is preferably the same as bonding adhesive 172, is applied around the outer perimeter of the interior surface 168 of the splicing plate 158 and interior to the tape 171, as illustrated in FIG. 13. The bonding adhesive 173 may be applied continuously or may be applied at various locations on the interior surface 168. The bonding adhesive 173 may have a thickness which is greater than, less than, or equal to the thickness of the tape 171.

Figure 14:
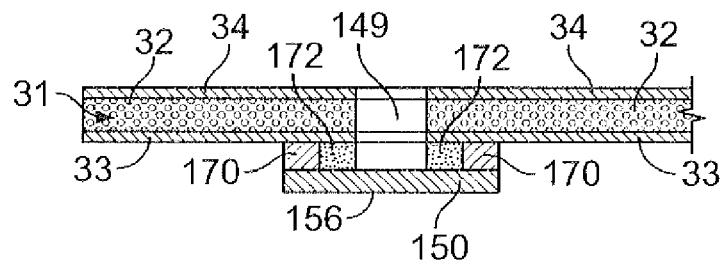
FIG. 14 illustrates a step of securing the logistics plate of FIG. 12 to the inner skin of the composite panel of FIG. 7 in accordance with the first embodiment of the method of the invention.

In step 109, the logistics plate 150 is secured to the inner skin 33 of the composite panel 31 by aligning the plurality of apertures 155 of the logistics plate 150 with the aperture(s) 149 of the composite panel 31 and by causing the bonding adhesive 172 applied to the logistics plate 150 to come into contact with the inner skin 33 of the composite panel 31, as illustrated in FIG. 14. The aperture(s) 149 of the composite panel 31 are thus accessible through the plurality of apertures 155 of the logistics plate 150. In order to ensure securement of the logistics plate 150 to the inner skin 33, pressure may be applied to one or both, of the logistics plate 150 and the composite panel 31. This provides that the top end 151 of the logistics plate 150 is positioned at, or preferably below, where the top rail 29 of the trailer 20 will be secured to the composite panel 31. This further provides that the bottom end 152 of the logistics plate 150 is positioned at, or preferably above, where the portion 44 of the bottom rail 30 will be secured to the composite panel 31. The securement causes the adhesive 172 to flow outwardly, and the tape 170 acts as a dam as it stops or substantially prevents the bonding adhesive 172 from running/flowing outside of the outer perimeter of the exterior surface 157 when the pressure is applied. Under pressure, the tape 170 is crushed such that the tape 170 and the adhesive 172 each have substantially the same thickness, preferably approximately 0.010 inches.

Figure 15:
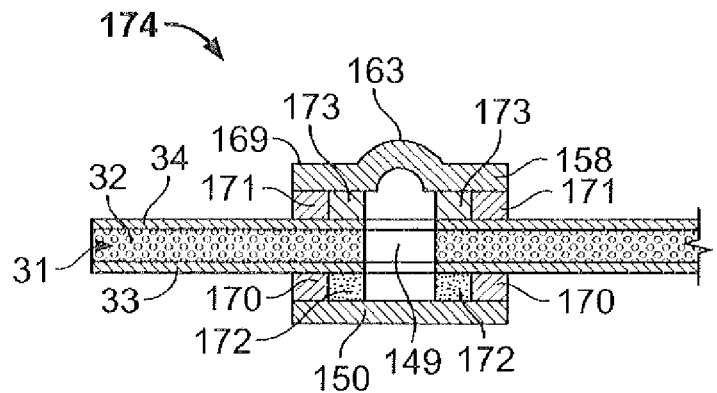
FIG. 15 illustrates a step of securing the splicing plate of FIG. 13 to the outer skin of the composite panel of FIG. 14 in accordance with the first embodiment of the method of the invention.

In step 110, the splicing plate 158 is secured to the outer skin 34 of the composite panel 31 by aligning the intermediate bulging portion 163 with the aperture(s) 149 of the composite panel 31 and by causing the bonding adhesive 173 applied to the splicing plate 158 to come into contact with the outer skin 34, as illustrated in FIG. 15. The aperture(s) 149 of the composite panel 31 are thus inaccessible through the splicing plate 158. In order to ensure securement of the splicing plate 158 to the outer skin 34 of the composite panel 31, pressure may be applied to one or both of the splicing plate 158 and the composite panel 31. The top end 164 of the splicing plate 158 is positioned at, or preferably below, where the top rail 29 will be secured to the composite panel 31; and the bottom end 165 of the splicing plate 158 is positioned at, or preferably above, where the portion 44 of the bottom rail 30 will be secured to the composite panel 31. This further seals off the aperture(s) 149 through the composite panel 31 so as to seal the interior of the trailer 20 from moisture. The securement causes the adhesive 173 to flow outwardly, and the tape 171 acts as a dam as it stops or substantially prevents the bonding adhesive 173 from running/flowing outside of the outer perimeter of the interior surface 168 when the pressure is applied. Under pressure, the tape 170 is crushed such that the tape 171 and the adhesive 173 each have substantially the same thickness, preferably about 0.010 inches.

As a result, logistics panels 174, which are illustrated in FIGS. 15, 39 and 40, are formed by steps 101-110. Where the aperture(s) 149 are provided through the logistics panels 174, the logistics panels 174 have a thickness of approximately 0.315 inches, which includes the thickness of the composite panel 31, the thickness of the tape 170 and the adhesive 172, and the thickness of the tape 171 and the adhesive 173, but not the thicknesses of the logistics plate 150 or the splicing plate 158. It should be noted that the steps 101-110 of the method 110 could be performed in any other logical order, for example steps 103, 105, 107 and 109 could be performed before steps 104, 106, 108 and 110 are performed, or vice versa. It should also be noted that some of the steps 101-110 could be performed at substantially the same time as some of the other steps 101-110 whenever possible. In other words, the order in which the steps 101-110 are performed as described hereinabove and as illustrated in FIG. 5 can be altered whenever feasible so long as the logistics panel 174 is formed as desired.

Figure 16A:
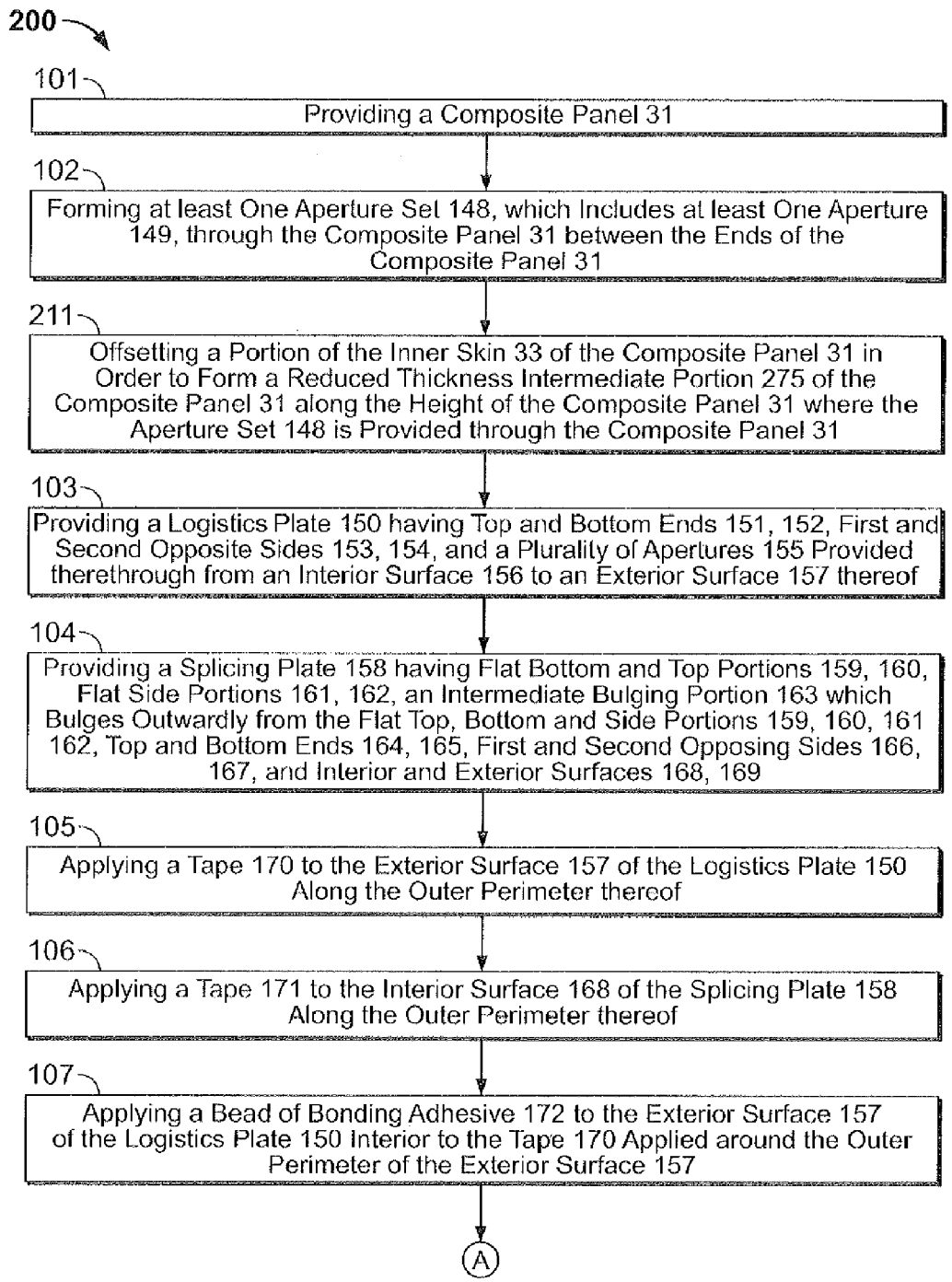
FIG. 16 is a flow chart identifying the steps of a second embodiment of a method of forming a logistics panel in accordance with the invention.
Figure 16B:
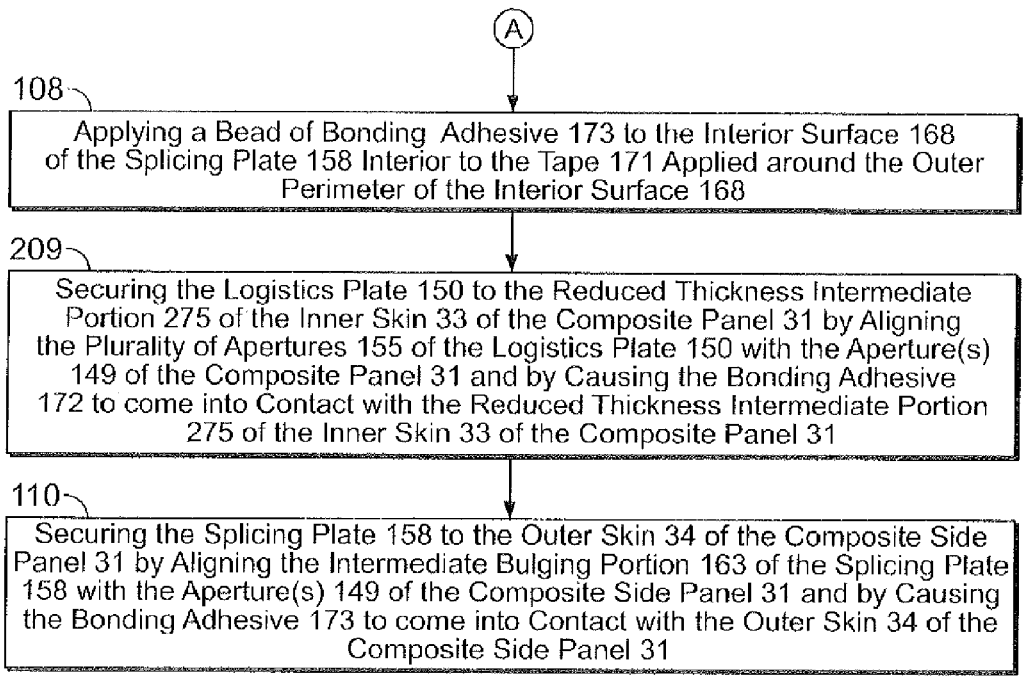
Figure 17:
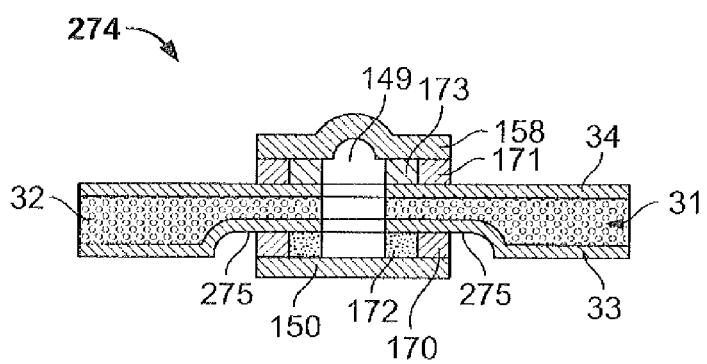
FIG. 17 is illustrates the steps of securing the logistics plate of FIG. 12 to a reduced thickness intermediate portion of the inner skin of the composite panel, and of securing the splicing plate of FIG. 13 to the outer skin of the composite panel in accordance with the second embodiment of the method of the invention.

Attention is invited to FIGS. 16 and 17 and the second embodiment of the method 200 of forming a logistics panel 274. Method 200 includes the steps 101-108 and 110 of method 100 and, therefore, the description of these steps will not be repeated herein for brevity purposes. Method 200 further includes step 211 and step 209, which is a modification of step 109 of method 100.

In step 211 of method 200, a portion of the inner skin 33 of the composite panel 31 is offset in order to form a reduced thickness intermediate portion 275 of the composite panel 31 either before, after, or substantially at the same time as, performing step 102, along a height of the composite panel 31. The reduced thickness intermediate portion 275 of the composite panel 31 preferably has a thickness of approximately 0.215 inches. As such, the aperture set 148 is provided through the reduced thickness intermediate portion 275. The reduced thickness intermediate portion 275 may be formed by coining or stepping the inner skin 33, which may cause the core member 32 provided between the inner and outer skins 33, 34 to compress. The reduced thickness intermediate portion 275 extends from a position below the top end 46 to a position above the bottom end 47 of the composite panel 31. The position below the top end 46 is provided at, or preferably below, where the top rail 29 of the trailer 20 will be secured to the composite panel 31. The position above the bottom end 47 is provided at, or preferably above, where the portion 44 of the bottom rail 30 will be secured to the composite panel 31.

Step 209 of method 200 secures the logistics plate 150 to the reduced thickness intermediate portion 275 of the inner skin 33 of the composite panel 31 by aligning the plurality of apertures 155 of the logistics plate 150 with the aperture(s) 149 of the composite panel 31 and by causing the bonding adhesive 172 applied to the logistics plate 150 to come into contact with the reduced thickness intermediate portion 275. The aperture(s) 149 of the composite panel 31 are thus accessible through the plurality of apertures 155 of the logistics plate 150. In order to ensure securement, pressure may be applied to one or both of the logistics plate 150 and the composite panel 31. The securement of the logistics plate 150 ensures that the logistics plate 150 will not extend as far into the interior of the trailer 20 as it will into the interior of the trailer 20 using the method 100, and may even be, depending on the thickness of the tape 170, the adhesive 172 and the logistics plate 150, flush with the interior surface of the inner skin 33 of the composite panel 31. This further provides that the top end 151 of the logistics plate 150 is positioned at, or preferably below, where the top rail 29 will be secured to the composite panel 31. This also provides that the bottom end 152 of the logistics plate 150 is positioned at, or preferably above, where the portion 44 of the bottom rail 30 will be secured to the composite panel 31. If the logistics plate 150 is flush or substantially flush with the interior surface of the inner skin 33, the logistics plate 150 may extend below where the portion 44 of the bottom rail 30 will be secured to the logistics panel 274, as the logistics plate 150 would then not interfere with the connection of the portion 44 of the bottom rail 30 to the logistics panel 274.

Thus, logistics panel 274 is formed by steps 101-108, 209, 110 and 211 of method 200. Where the aperture(s) 149 are provided through the logistics panels 274, the logistics panels 274 have a thickness of approximately 0.235 inches, which includes the thickness of the composite panel 31, the thickness of the tape 170 and the adhesive 172, and the thickness of the tape 171 and the adhesive 173, but not the thicknesses of the logistics plate 150 or the splicing plate 158. It should be noted that the steps 101-108, 209, 110 and 211 of the method 200 could be performed in any other logical order, for example steps 103, 105, 107 and 209 could be performed before steps 104, 106, 108 and 110 are performed, or vice versa. It should also be noted that some of the steps 101-108, 209, 110 and 211 could be performed at substantially the same time as some of the other steps 101-108, 209, 110 and 211 whenever possible. In other words, the order in which the steps 101-108, 209, 110 and 211 are performed as described hereinabove and as illustrated in FIG. 16 can be altered whenever feasible so long as the logistics panel 274 is formed as desired.

Figure 18A:
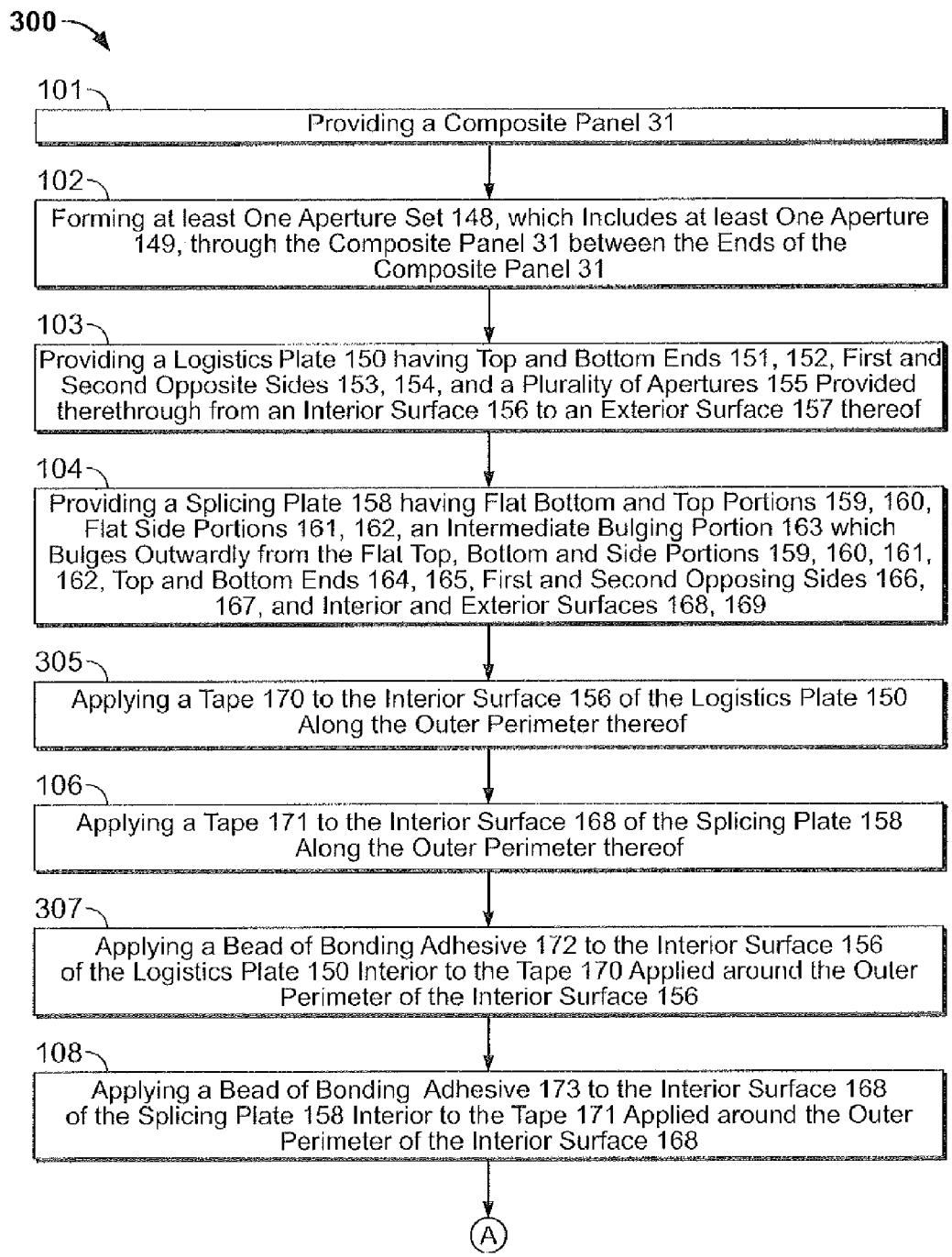
FIG. 18 is a flow chart identifying the steps of a third embodiment of a method of forming a logistics panel in accordance with the invention.
Figure 18B:
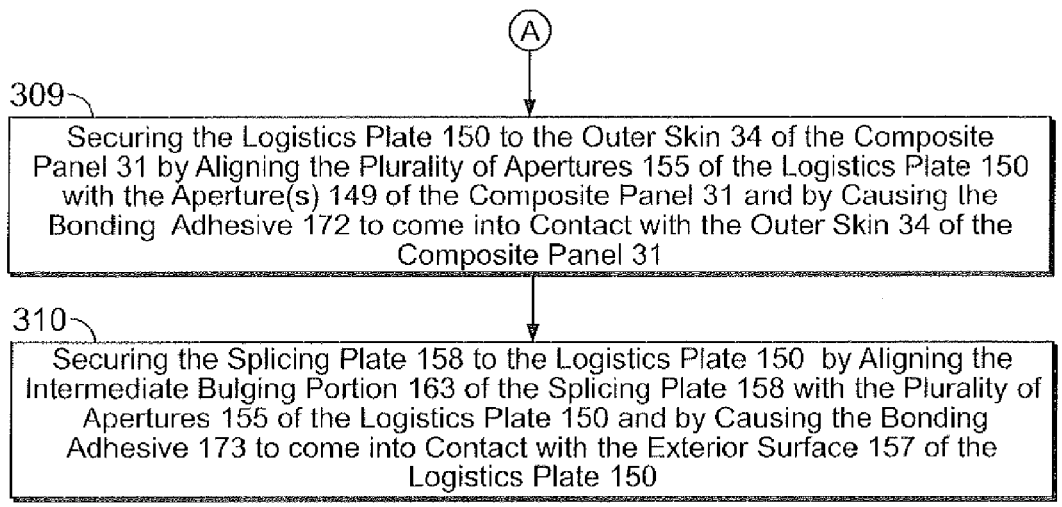
Figure 19:
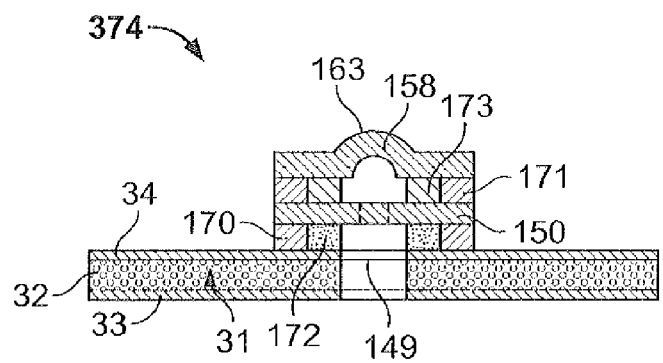
FIG. 19 illustrates the steps of securing the logistics plate of FIG. 12 to an outer skin of the composite panel of FIG. 7 and of securing the splicing plate of FIG. 13 to the logistics plate in accordance with the third embodiment of the method of the invention.

Attention is now invited to FIGS. 18 and 19 and the third embodiment of the method 300. Method 300 includes the steps 101-104, 106 and 108 of method 100 and, therefore, the description of these steps will not be repeated herein for brevity purposes. Method 300 further includes steps 305, 307, 309 and 310, which are modifications of steps 105, 107, 109 and 110, respectively, of method 100.

In step 305, the tape 170 is applied to the interior surface 156 of the logistics plate 150 along the outer perimeter thereof, e.g., along the top and bottom ends 151, 152 and along the first and second sides 153, 154.

Next, in step 307, a bead of bonding adhesive 172 is applied around the outer perimeter of the interior surface 156 of the logistics plate 150 and interior to the tape 170. The bonding adhesive 172 may be applied continuously or may be applied at various locations on the interior surface 156. The bonding adhesive 172 may have a thickness which is greater than, less than, or equal to the thickness of the tape 170.

In step 309, the logistics plate 150 is secured to the outer skin 34 of the composite panel 31 by aligning the plurality of apertures 155 of the logistics plate 150 with the aperture(s) 149 of the composite panel 31 and by causing the bonding adhesive 172 applied to the logistics plate 150 to come into contact with the outer skin 34 of the composite panel 31. The aperture(s) 149 of the composite panel 31 are thus accessible through the plurality of apertures 155 of the logistics plate 150. In order to ensure securement of the logistics plate 150 to the outer skin 34 of the composite panel 31, pressure may be applied to one or both of the logistics plate 150 and the composite panel 31. This provides that the top end 151 of the logistics plate 150 is positioned at, or preferably below, where the top rail 29 will be secured to the composite panel 31, and provides that the bottom end 152 of the logistics plate 150 is positioned at, or preferably above, where the portion 44 of the bottom rail 30 will be secured to the composite panel 31. The securement causes the adhesive 172 to flow outwardly with the tape 170 acting as a dam as it stops or substantially prevents the bonding adhesive 172 from running/flowing outside of the outer perimeter of the interior surface 156 when the pressure is applied. Under pressure, the tape 170 is crushed such that the tape 170 and the adhesive 172 each have substantially the same thickness, preferably about 0.010 inches.

In step 310, the splicing plate 158 is secured to the logistics plate 150 by aligning the intermediate bulging portion 163 of the splicing plate 158 with the plurality of apertures 155 of the logistics plate 150 and by causing the bonding adhesive 173 applied to the splicing plate 158 to come into contact with the exterior surface 157 of the logistics plate 150. The aperture(s) 149 of the composite panel 31 are thus inaccessible through the splicing plate 158. In order to ensure securement of the splicing plate 158 to the logistics plate 150, pressure may be applied to one or both of the splicing plate 158 and the composite panel 31. This provides that the top end 164 of the splicing plate 158 is positioned at, or preferably below, where the top rail 29 will be secured to the composite panel 31, and that the bottom end 165 of the splicing plate 158 is positioned at, or preferably above, where the portion 44 of the bottom rail 30 will be secured to the composite panel 31. This further seals off the aperture(s) 149 through the composite panel 31 so as to seal the interior of the trailer 20 from moisture. The securement causes the adhesive 172 to flow outwardly with the tape 171 acting as a dam as it stops or substantially prevents the bonding adhesive 173 from running/flowing outside of the outer perimeter of the interior surface 168 when the pressure is applied. Under pressure, the tape 171 is crushed such that the tape 171 and the adhesive 173 each have substantially the same thickness, preferably about 0.01.0 inches.

Thus, logistics panel 374 is formed by steps 101-104, 305, 106, 307, 108, 309 and 310 of the method 300. It should be noted that the steps 101-104, 305, 106, 307, 108, 309 and 310 of the method 300 could be performed in any other logical order, for example steps 103, 305, 307 and 309 could be performed before steps 104, 106, 108 and 310 are performed, or vice versa. It should also be noted that some of the steps 101-104, 305, 106, 307, 108, 309 and 310 could be performed at substantially the same time as some of the other steps 101-104, 305, 106, 307, 108, 309 and 310 whenever possible. In other words, the order in which the steps 101-104, 305, 106, 307, 108, 309 and 310 are performed as described hereinabove and as illustrated in FIG. 18 can be altered whenever feasible so long as the logistics panel 374 is formed as desired.

Figure 20A:
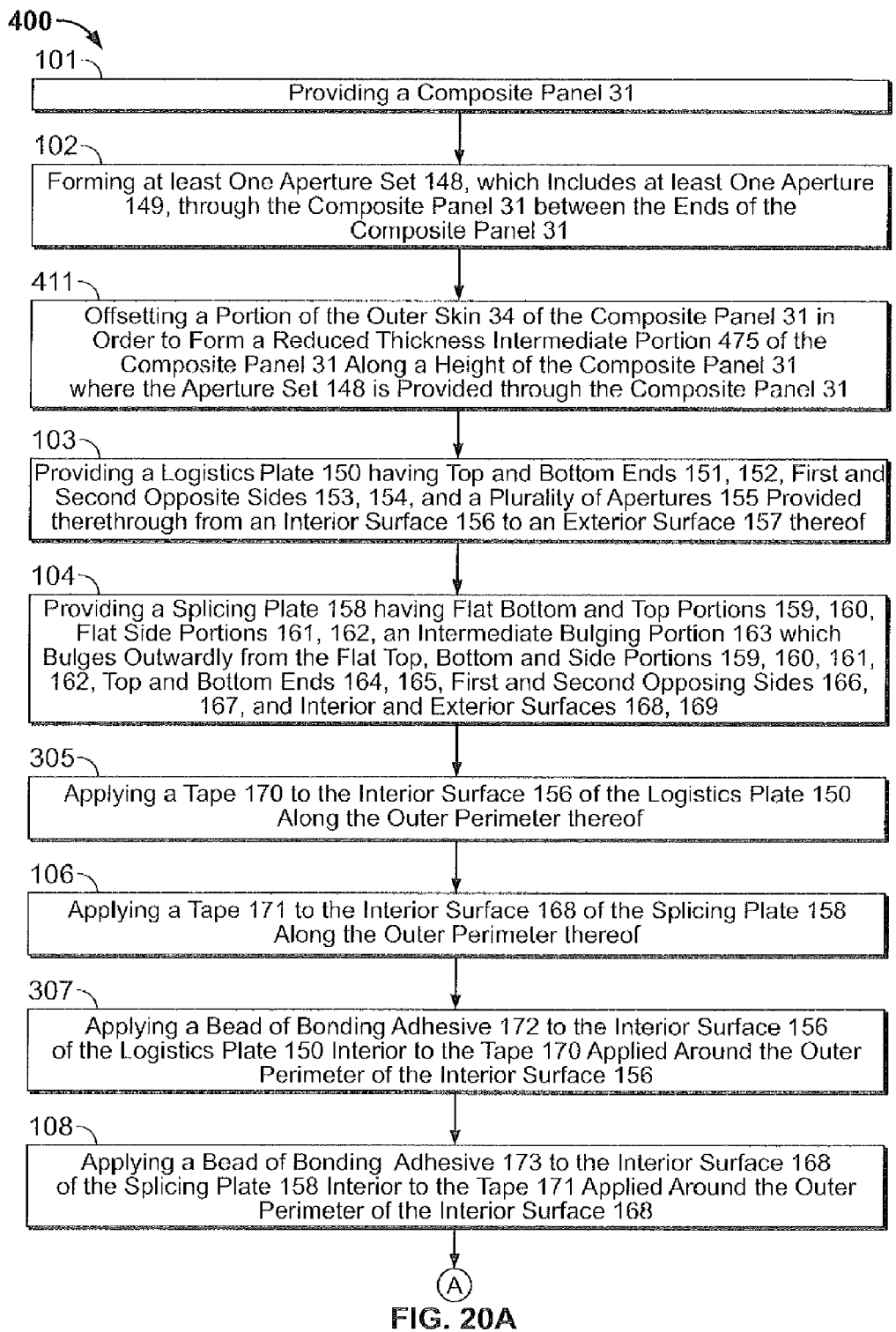
FIG. 20 is a flow chart identifying the steps of a fourth embodiment of a method of forming a logistics panel in accordance with the invention.
Figure 20B:
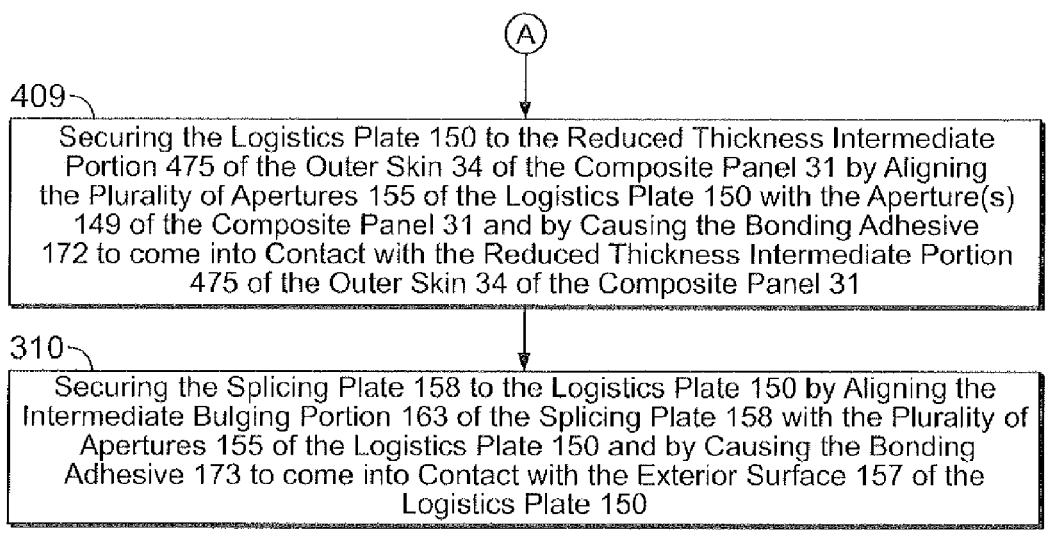
Figure 21:
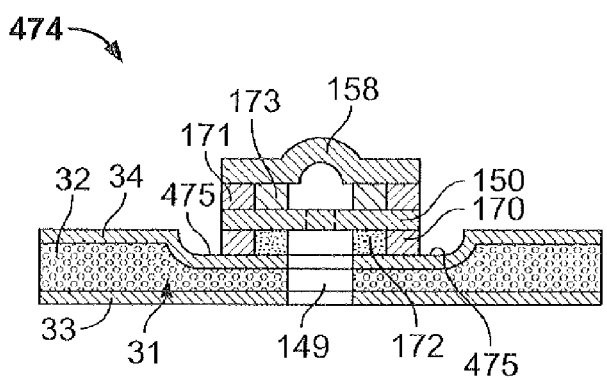
FIG. 21 illustrates the steps of securing the logistics plate of FIG. 12 to a reduced thickness intermediate portion of the outer skin of the composite panel, and of securing the splicing plate of FIG. 13 to the logistics plate in accordance with the fourth embodiment of the method of the invention.

Attention is invited to FIGS. 20 and 21 and the fourth embodiment of the method 400. Method 400 includes the steps 101-104, 106 and 108 of method 100 and steps 305, 307 and 310 of method 300 and, therefore, the description of these steps will not be repeated herein for brevity purposes. Method 400 further includes steps 409 and 411. Step 409 is a modification of steps 209 and 309 of methods 200 and 300, and step 411 is a modification of step 211 of method 200.

In step 411, a portion of the outer skin 34 of the composite panel 31 is offset in order to form a reduced thickness intermediate portion 475 of the composite panel 31 either before, after, or substantially at the same time as, performing step 102, along a height of the composite panel 31. The reduced thickness intermediate portion 475 of the composite panel 31 preferably has a thickness of approximately 0.215 inches. As such, the aperture set 148 is provided through the reduced thickness intermediate portion 475. The reduced thickness intermediate portion 475 may be formed by coining or stepping the outer skin 34 of the composite panel 31, which may cause the core member 32 provided between the inner and outer skins 33, 34 to be compressed. The reduced thickness intermediate portion 475 thus extends from a position below the top end 46 to a position above the bottom end 47 of the composite panel 31. The position below the top end 46 is a position which is provided at, or preferably below, where the top rail 29 of the trailer 20 will be secured to the composite panel 31. The position above the bottom end 47 of the composite panel 31 is a position which is provided at, or preferably above, where the portion 44 of the bottom rail 30 will be secured to the composite panel 31.

In step 409, the logistics plate 150 is secured to the reduced thickness intermediate portion 475 by aligning the plurality of apertures 155 of the logistics plate 150 with the aperture(s) 149 of the composite panel 31 and by causing the bonding adhesive 172 applied to the logistics plate 150 to come into contact with the reduced thickness intermediate portion 475. The aperture(s) 149 of the composite panel 31 are thus accessible through the plurality of apertures 155 of the logistics plate 150. In order to ensure securement of the logistics plate 150 to the reduced thickness intermediate portion 475, pressure may be applied to one or both of the logistics plate 150 and the composite panel 31. This provides that the top end 151 of the logistics plate 150 is positioned at, or preferably below, where the top rail 29 will be secured to the composite panel 31. If the logistics plate 150 is flush or substantially flush with the exterior surface of the outer skin 34 of the composite panel 31, the logistics plate 150 may extend above where the top rail 29 will be secured to the logistics panel 474, as the logistics plate 150 would then not interfere with the connection of the top rail 29 to the logistics panel 474. This further provides that the bottom end 152 of the logistics plate 150 is positioned at, or preferably above, where the portion 44 of the bottom rail 30 will be secured to the composite panel 31. If the logistics plate 150 is flush or substantially flush with the exterior surface of the outer skin 34 of the composite panel 31, the logistics plate 150 may extend below where the portion 44 of the bottom rail 30 will be secured to the logistics panel 474, as the logistics plate 150 would then not interfere with the connection of the portion 44 of the bottom rail 30 to the logistics panel 474. The securement causes the adhesive 172 to flow outwardly with the tape 170 applied to the logistics plate 150 acting as a dam as it stops or substantially prevents the bonding adhesive 172 from running/flowing outside of the outer perimeter of the interior surface 156 when the pressure is applied. Under pressure, the tape 170 is crushed such that the tape 170 and the adhesive 172 each have substantially the same thickness, preferably about 0.010 inches.

Thus, logistics panel 474 is formed by steps 101-104, 305, 106, 307, 108, 409, 310 and 411 of the method 400. It should be noted that the steps 101-104, 305, 106, 307, 108, 409, 310 and 411 of the method 400 could be performed in any other logical order, for example steps 103, 305, 307 and 409 could be performed before steps 104, 106, 108 and 310 are performed, or vice versa. It should also be noted that some of the steps 101-104, 305, 106, 307, 108, 409, 310 and 411 could be performed at substantially the same time as some of the other steps 101-104, 305, 106, 307, 108, 409, 310 and 411 whenever possible. In other words, the order in which the steps 101-104, 305, 106, 307, 108, 409, 310 and 411 are performed as described hereinabove and as illustrated in FIG. 20 can be altered whenever feasible so long as the logistics panel 474 is formed as desired.

Figure 22A:
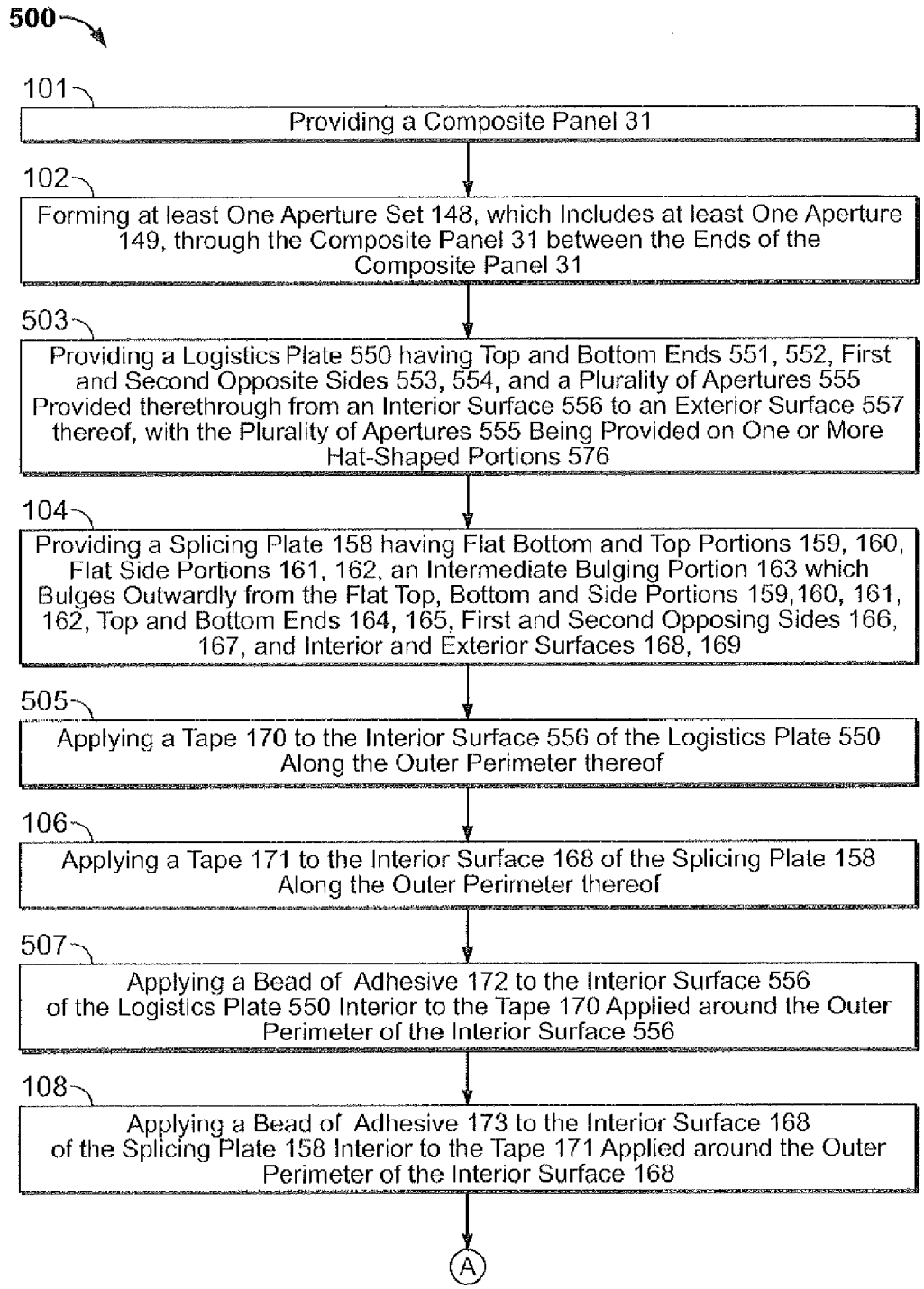
FIG. 22 is a flow chart identifying the steps of a fifth embodiment of a method of forming a logistics panel in accordance with the invention.

Attention is invited to FIGS. 22-24 and the fifth embodiment of the method 500. Method 500 includes the steps 101, 102, 104, 106 and 108 of method 100 and, therefore, the description of these steps will not be repeated herein for brevity purposes. Method 500 further includes steps 503, 505, 507, 509 and 510. Step 503 is a modification of step 103 of method 100. Step 505 is a modification of steps 105 and 305 of methods 100 and 300. Step 507 is a modification of steps 107 and 307 of methods 100 and 300. Step 509 is a modification of steps 109 and 309 of methods 100 and 300. Step 510 is a modification of steps 110 and 310 of methods 100 and 300.

In step 503, a logistics plate 550 is provided as illustrated in FIG. 23, which is different in configuration from logistics plate 150. Logistics plate 550 has a reduced height which is comparable to the reduced height of logistics plate 150. The logistics plate 550 has top and bottom ends 551, 552, first and second opposite sides 553, 554 and a plurality of apertures 555 provided from an interior surface 556 to an exterior surface 557 thereof. The apertures 555 are the logistics apertures and are separated from one another by a predetermined distance along the height of the logistics plate 550. The plurality of apertures 555 are generally equivalent in size and shape to the plurality of apertures 41 provided through the interior post 36, but are preferably smaller in size than the aperture(s) 149 provided through the composite panels 31, for reasons which will be discussed herein. The plurality of apertures 555 are provided on one or more hat-shaped portions 576 of the logistics plate 550. If more than one hat-shaped portion 576 is provided, adjacent hat-shaped portions 576 are separated from one another by a predetermined distance. Each hat-shaped portion 576 has first and second portions 577, 578, which are planar to one another and which extend toward one another from the first and second opposite sides 553, 554, third and fourth portions 579, 580, which are parallel to one another, perpendicular to the first and second portions 577, 578, and which extend inwardly from ends of the first and second portions 577, 578, respectively, and a fifth portion 581 which is parallel to the first and second portions 577, 578 and which connects the third and fourth portions 579, 580 together. The plurality of apertures 555 extend through the fifth portion 581. The third, fourth and fifth portions 579, 580, 581 of the hat-shaped portion 576 are generally sized to fit in the aperture(s) 149 of the composite panel 31. As such, the exterior surface 557 of the fifth portion 581 is preferably inset from the interior surfaces 556 of the first and second portions 577, 578 by approximately 0.285 inches.

In step 505, the tape 170 is applied to the interior surface 556 of the logistics plate 550 along the outer perimeter thereof, e.g., along the top and bottom ends 551, 552 and along the first and second sides 553, 554.

In step 507, the bead of bonding adhesive 172 is applied around the outer perimeter of the interior surface 556 interior to the tape 170, but exterior to the third and fourth portions 579, 580. The bonding adhesive 172 may be applied continuously or may be applied at various locations on the interior surface 556. The bonding adhesive 172 may have a thickness which is greater than, less than, or equal to the thickness of the tape 170.

In step 509, the logistics plate 550 is secured to the outer skin 34 by inserting the third, fourth and fifth portions 579, 580, 581 of the hat-shaped portion(s) 576 into the aperture(s) 149 of the composite panel 31. The third and fourth portions 579, 580 are preferably snugly fit against the walls defining the aperture(s) 149, and cause the bonding adhesive 172 applied to the logistics plate 550 to come into contact with the outer skin 34. The aperture(s) 149 of the composite panel 31 are accessible through the plurality of apertures 555 of the logistics plate 550. In order to ensure securement of the logistics plate 550 to the outer skin 34, pressure may be applied to one or both of the logistics plate 550 and the composite panel 31. The plurality of apertures 555 through the logistics plate 550 are thus accessible from the interior of the trailer 20. The securement of the logistics panel 550 provides that the top end 551 of the logistics plate 550 is positioned at, or preferably below, where the top rail 29 will be secured to the composite panel 31, and that the bottom end 552 of the logistics plate 550 is positioned at, or preferably above, where the portion 44 of the bottom rail 30 will be secured to the composite panel 31. The securement causes the adhesive 172 to flow outwardly with the tape 170 acting as a dam as it stops or substantially prevents the bonding adhesive 172 from running/flowing outside of the outer perimeter of the interior surface 556 when the pressure is applied. Under pressure, the tape 170 is crushed such that the tape 170 and the adhesive 172 each have substantially the same thickness, preferably about 0.010 inches.

In step 510, the splicing plate 158 is secured to the logistics plate 550 by aligning the intermediate bulging portion 163 of the splicing plate 158 with the plurality of apertures 555 of the logistics plate 550 and by causing the bonding adhesive 173 applied to the splicing plate 158 to come into contact with the exterior surface 557 of the logistics plate 550. The aperture(s) 149 of the composite panel 31 are inaccessible through the splicing plate 158. In order to ensure securement, pressure may be applied to one or both of the splicing plate 158 and the composite panel 31. The securement of the splicing plate 158 provides that the top end 164 of the splicing plate 158 is positioned at, or preferably below, where the top rail 29 will be secured to the composite panel 31, and that the bottom end 165 of the splicing plate 158 is positioned at, or preferably above, where the portion 44 of the bottom rail 30 will be secured to the composite panel 31. This further seals off the aperture(s) 149 through the composite panel 31 so as to seal the interior of the trailer 20 from moisture. The securement causes the adhesive 173 to flow outwardly with the tape 171 acting as a dam as it stops or substantially prevents the bonding adhesive 173 from running/flowing outside of the outer perimeter of the interior surface 168 when the pressure is applied. Under pressure, the tape 171 is crushed such that the tape 171 and the adhesive 173 each have substantially the same thickness, preferably about 0.010 inches.

Thus, logistics panel 574 is formed by steps 101, 102, 503, 104, 505, 106, 507, 108, 509 and 510 of the method 500. It should be noted that the steps 101, 102, 503, 104, 505, 106, 507, 108, 509 and 510 of the method 500 could be performed in any other logical order, for example steps 503, 505, 507 and 509 could be performed before steps 104, 106, 108 and 510 are performed, or vice versa. It should also be noted that some of the steps 101, 102, 503, 104, 505, 106, 507, 108, 509 and 510 could be performed at substantially the same time as some of the other steps 101, 102, 503, 104, 505, 106, 507, 108, 509 and 510 whenever possible. In other words, the order in which the steps 101, 102, 503, 104, 505, 106, 507, 108, 509 and 510 are performed as described hereinabove and as illustrated in FIG. 22 can be altered whenever so long as the logistics panel 574 is formed as desired.

Figure 25A:
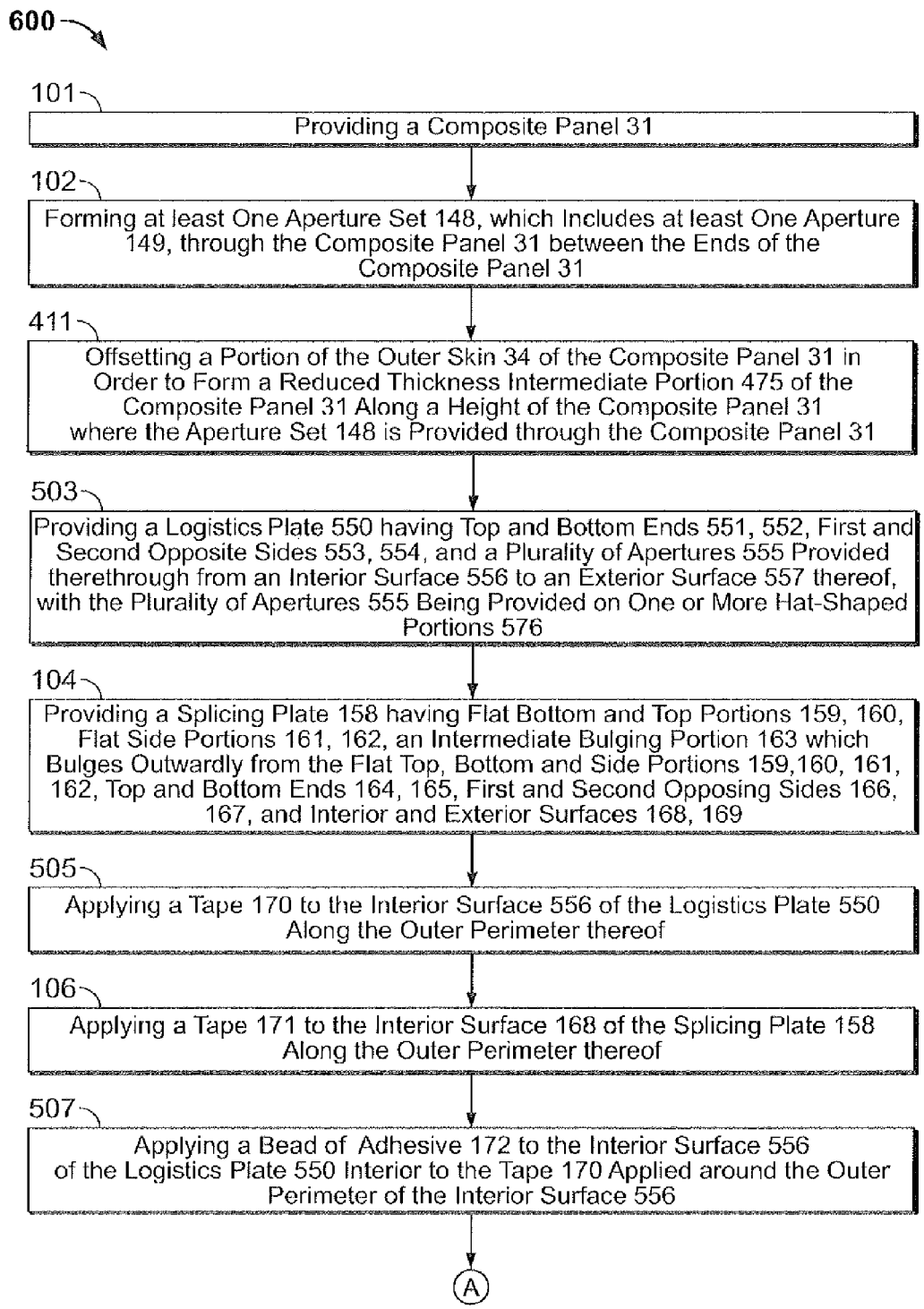
FIG. 25 is a flow chart identifying the steps of a sixth embodiment of a method of forming a logistics panel in accordance with the invention.
Figure 25B:
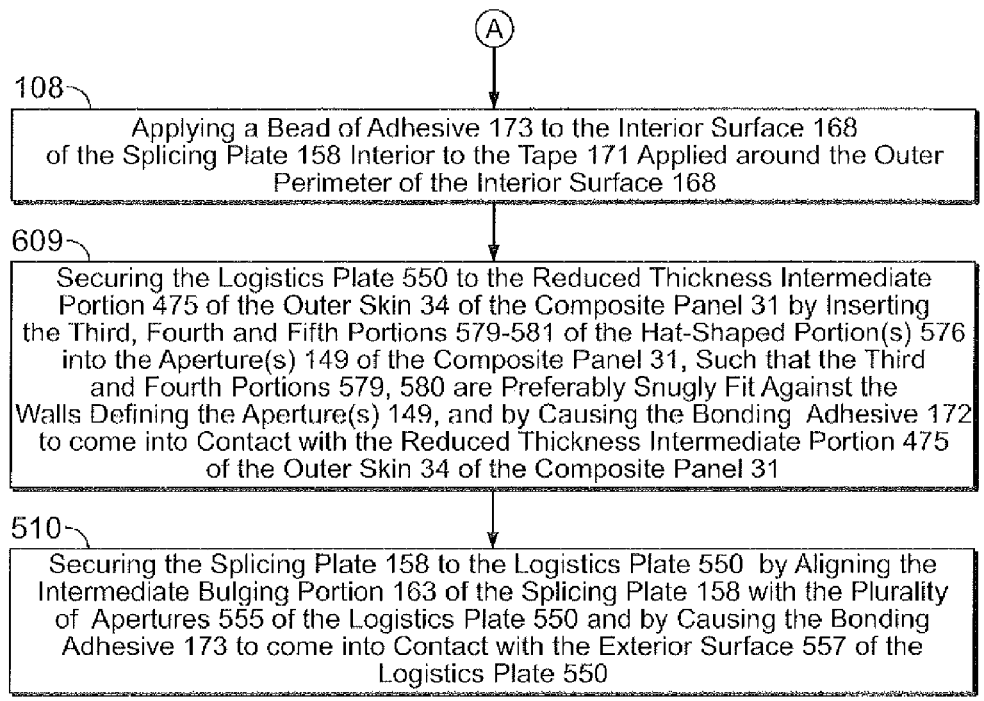
Figure 26:
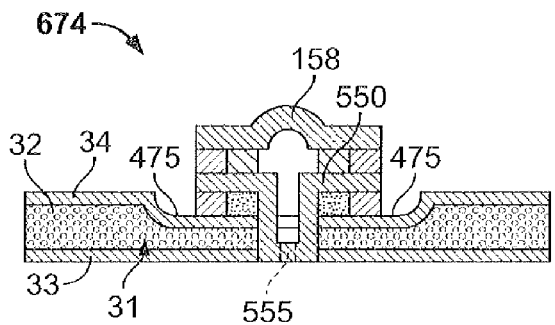
FIG. 26 illustrates the steps of securing the logistics plate to the reduced thickness intermediate portion of the outer skin of the composite panel, and of securing the splicing plate of FIG. 13 to the logistics plate in accordance with the sixth embodiment of the method of the invention.

Attention is invited to FIGS. 25 and 26 and the sixth embodiment of the method 600. Method 600 includes the steps 101, 102, 503, 104, 505, 106, 507, 108, 510 and 411 of methods 100, 400 and 500 and, therefore, the description of these steps will not be repeated herein for brevity purposes. Method 600 further includes step 609 which is a modification of steps 509 of method 500.

In step 609, the logistics plate 550 is secured to the reduced thickness intermediate portion 475 of the outer skin 34 by inserting the third, fourth and fifth portions 579, 580, 581 of the logistics plate 550 into the aperture(s) 149 of the composite panel 31. The third and fourth portions 579, 580 are preferably snugly fit against the walls defining the aperture(s) 149, and cause the bonding adhesive 172 applied to the logistics plate 550 to come into contact with the reduced thickness intermediate portion 475 of the outer skin 34. The aperture(s) 149 of the composite panel 31 are thus accessible through the plurality of apertures 555 of the logistics plate 550. In order to ensure securement, pressure may be applied to one or both of the logistics plate 550 and the composite panel 31. The securement of the logistics panel 550 provides that the top end 551 of the logistics plate 550 is positioned at, or preferably below, where the top rail 29 will be secured to the composite panel 31. If the logistics plate 550 is flush or substantially flush with the exterior surface of the outer skin 34, the logistics plate 550 may extend above where the top rail 29 will be secured to the logistics panel 674, as the logistics plate 550 would then not interfere with the connection of the top rail 29 to the logistics panel 674. The securement of the logistics plate 550 further provides that the bottom end 552 of the logistics plate 550 is positioned at, or preferably above, where the portion 44 of the bottom rail 30 will be secured to the composite panel 31. If the logistics plate 550 is flush or substantially flush with the exterior surface of the outer skin 34, the logistics plate 550 may extend below where the portion 44 of the bottom rail 30 will be secured to the logistics panel 674, as the logistics plate 550 would then not interfere with the connection of the portion 44 of the bottom rail 30 to the logistics panel 674. The securement causes the adhesive 172 to flow outwardly with the tape 170 acting as a dam as it stops or substantially prevents the bonding adhesive 172 from running/flowing outside of the outer perimeter of the interior surface 556 when the pressure is applied. Under pressure, the tape 170 is crushed such that the tape 170 and the adhesive 172 each have substantially the same thickness, preferably about 0.010 inches.

Thus, logistics panel 674 is formed by steps 101, 102, 503, 104, 505, 106, 507, 108, 609, 510 and 411 of the method 600. It should be noted that the steps 101, 102, 503, 104, 505, 106, 507, 108, 609, 510 and 411 of the method 600 could be performed in any other logical order, for example steps 503, 505, 507 and 609 could be performed before steps 104, 106, 108 and 510 are performed, or vice versa. It should also be noted that some of the steps 101, 102, 503, 104, 505, 106, 507, 108, 609, 510 and 411 could be performed at substantially the same time as some of the other steps 101, 102, 503, 104, 505, 106, 507, 108, 609, 510 and 411 whenever possible. In other words, the order in which the steps 101, 102, 503, 104, 505, 106, 507, 108, 609, 510 and 411 are performed as described hereinabove and as illustrated in FIG. 25 can be altered whenever so long as the logistics panel 674 is formed as desired.

It should be noted that the configuration of the logistics panels 150, 550 could be altered as desired so long as they provide the apertures 155, 555 therethrough and preferably span the aperture(s) 149.

Figure 27:
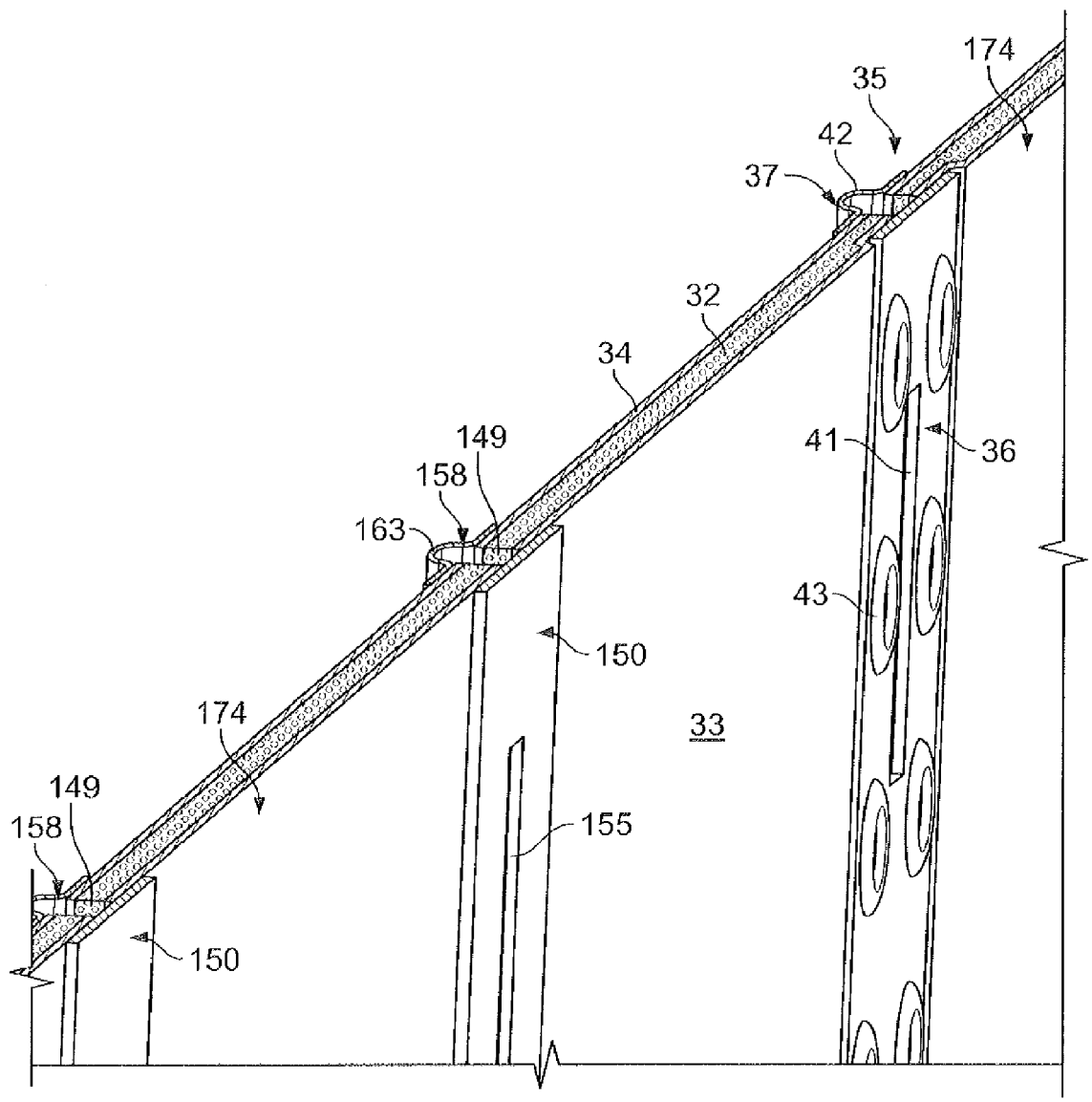
FIG. 27 is a cross-sectional perspective view illustrating the a pair of adjacent logistics panels formed in accordance with the first embodiment of the invention being joined together.

To form the sidewall 22 of the trailer 20, a plurality of the logistics panels 174, 274, 374, 474, 574, 674 may be secured together using a joint configuration, such as the joint configurations disclosed in U.S. Pat. Nos. 4,958,472, 5,860,693, 5,997,076, 6,220,651, 6,412,854 or 6,986,546, which have been incorporated herein by reference. It should be noted that any one of the logistics panels 174, 274, 374, 474, 574, 674 may be secured together with any other one of the logistics panels 174, 274, 374, 474, 574, 674 if desired. In other words, logistics panel 174 need not be secured together with another logistics panel 174, but may be secured together with any one of the logistics panels 274, 374, 474, 574, 674. FIG. 27 illustrates two logistics panels 174 being joined together by a joint configuration 35.

Figure 28:
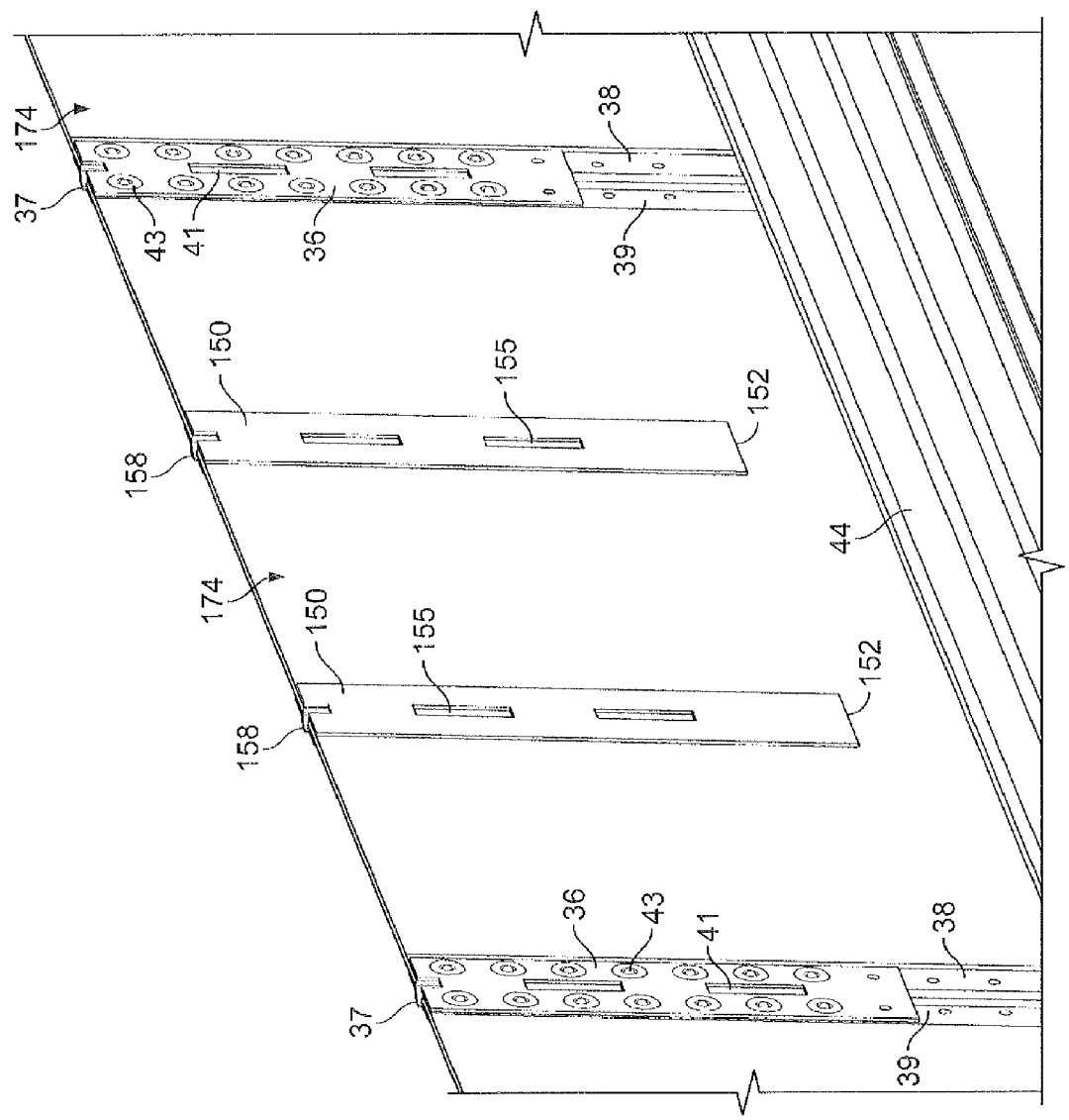
FIG. 28 is a cross-sectional interior perspective view of the joined adjacent logistics panels of FIG. 27 being secured to a bottom rail.
Figure 29:
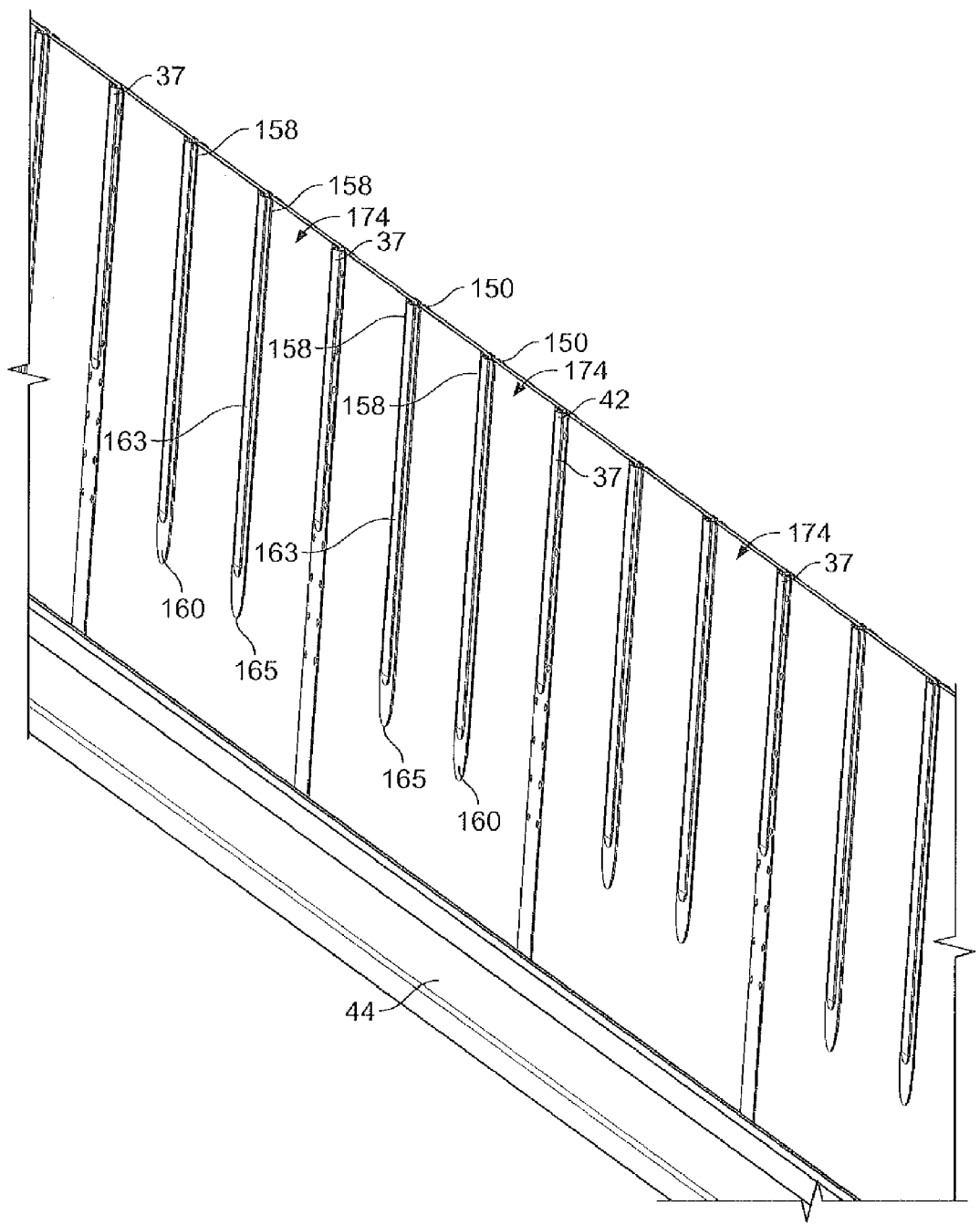
FIG. 29 is a cross-sectional exterior perspective view of the joined adjacent logistics panels of FIG. 27 being secured to the bottom rail.

To form the sidewall 22 of the trailer 20, each logistics panel 174, 274, 374, 474, 574, 674 is secured to the top and bottom rails 29, 30 of the trailer 20. Each logistics panel 174, 274, 374, 474, 574, 674 can be secured to the top rail 29 in the same well-known manner that the composite panels 31 of the prior art are secured to the top rail 29, for example by adhesive and/or fasteners. FIGS. 28 and 29 illustrate two logistics panels 174, which have been cut in half in height, secured to the portion 44 of the bottom rail 30. Each logistics panel 174, 274, 374, 474, 574, 674 is secured to the portion 44 of the bottom rail 30 in the same well-known manner that the composite panels 31 of the prior art are secured to the bottom rail 30, for example by adhesive and/or fasteners. FIGS. 30 and 31 illustrate the formed sidewall 22 of the trailer 20.

Figure 32:
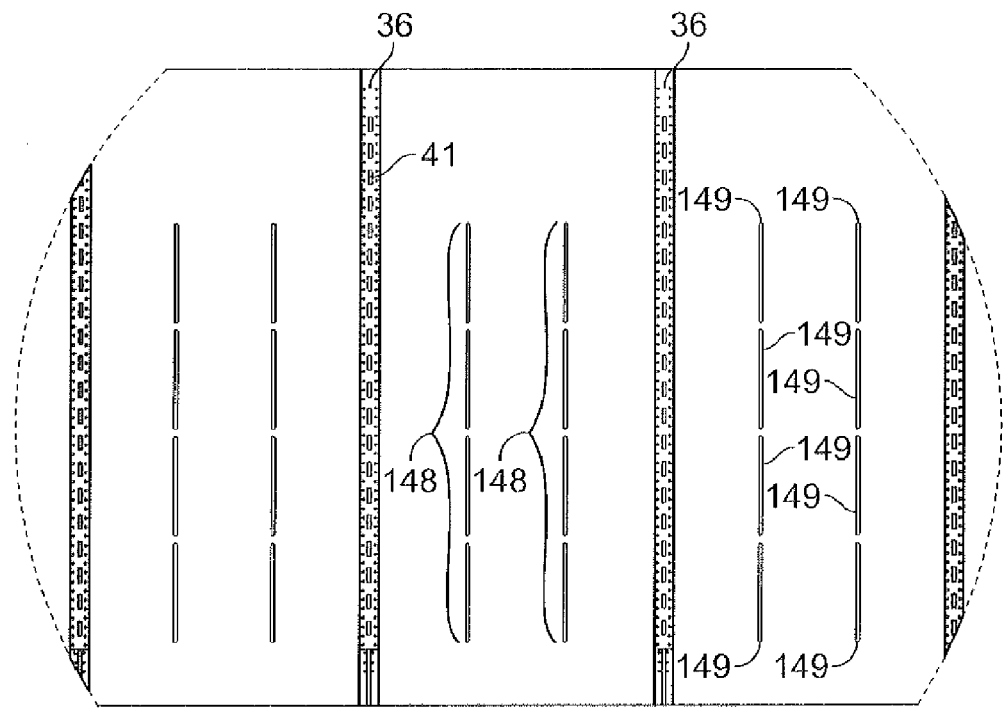
FIG. 32 is an interior side view illustrating the composite panels having aperture sets provided therethrough being secured to adjacent composite panels prior to logistics plates in alignment with the aperture sets being secured to the composite panels or the top and bottom rails.
Figure 33:
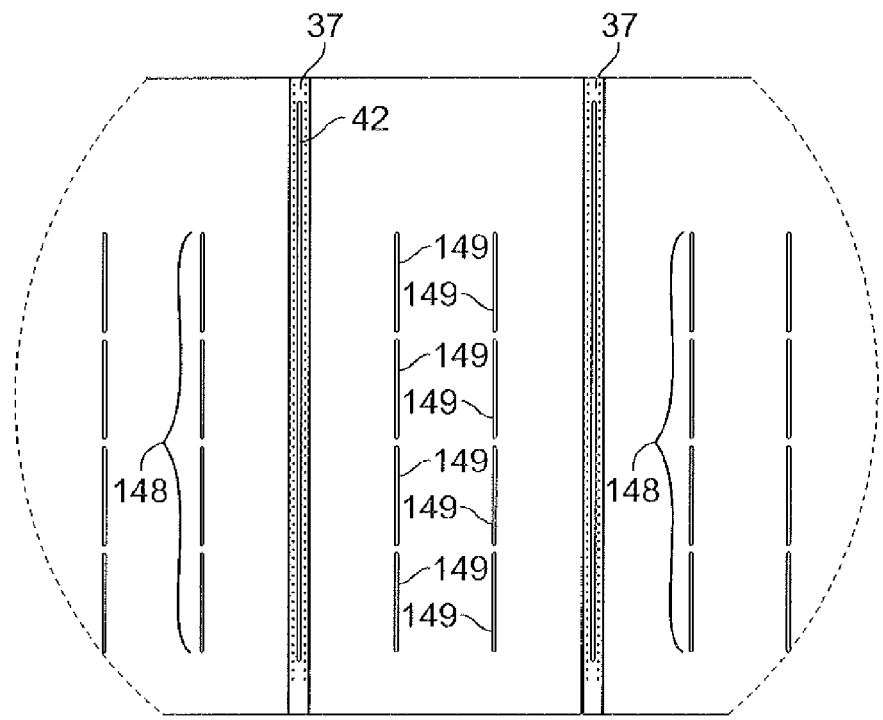
FIG. 33 is an exterior side view illustrating the composite panels having aperture sets provided therethrough being secured to adjacent composite panels prior to splicing plates in alignment with the aperture sets being secured to the composite panels or the top and bottom rails.
Figure 34:
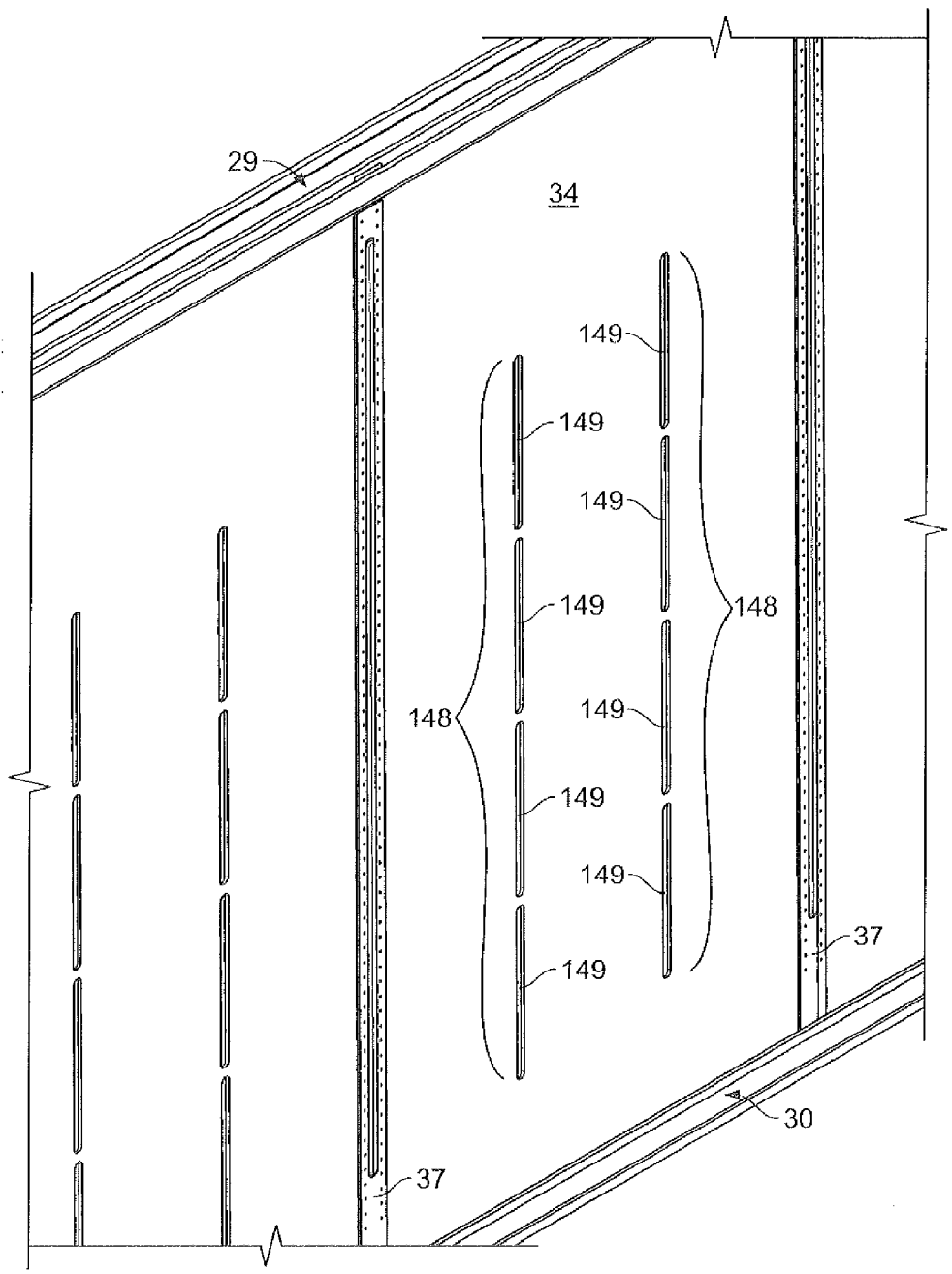
FIG. 34 is an exterior perspective view illustrating the composite panels having aperture sets provided therethrough being secured to adjacent composite panels and to said top and bottom rails prior to logistics and splicing plates in alignment with the aperture sets being secured to the composite panels.
Figure 35:
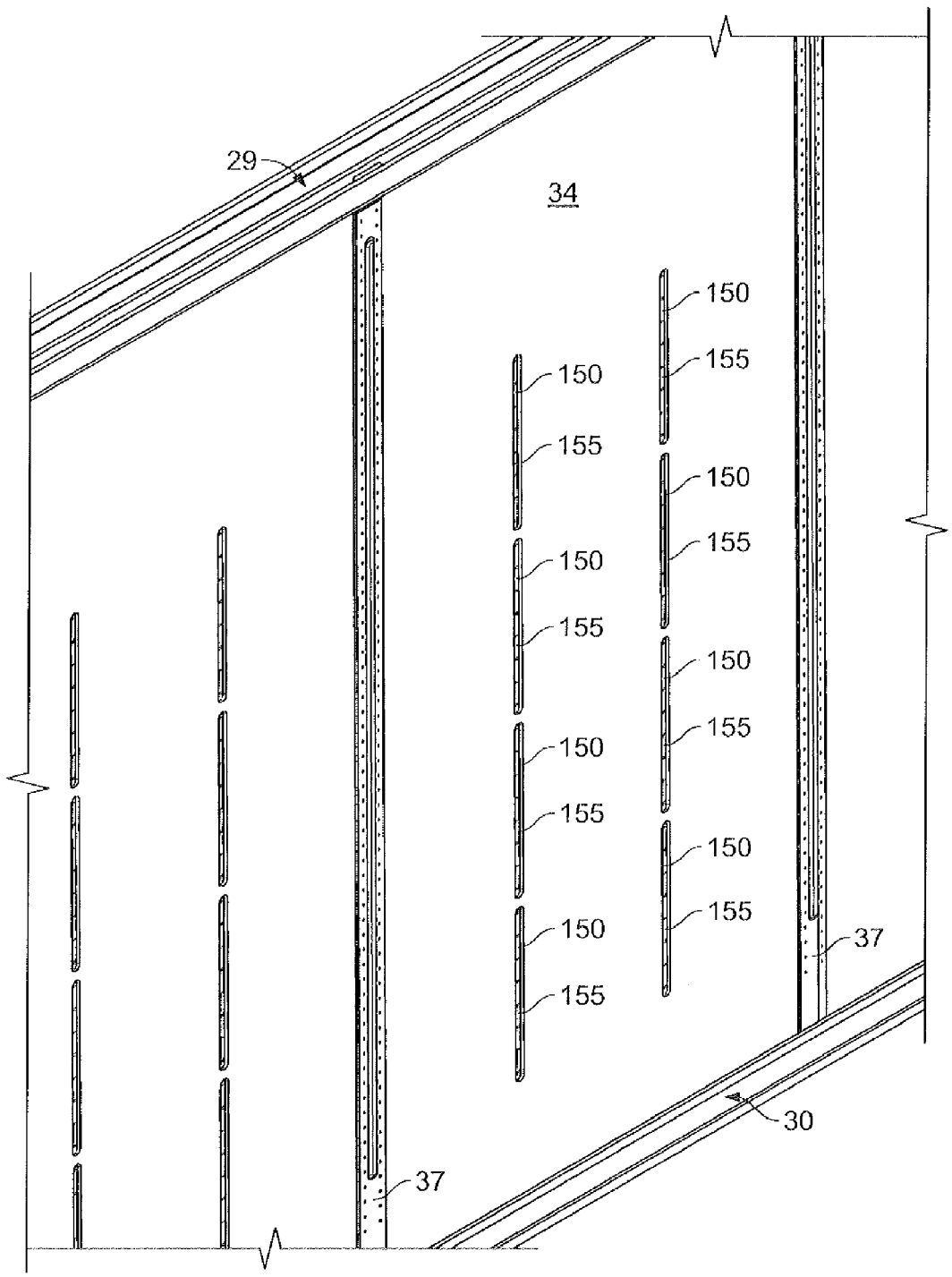
FIG. 35 is an exterior perspective view illustrating the composite panels having aperture sets provided therethrough being secured to adjacent composite panels and to said top and bottom rails prior to splicing plates in alignment with the aperture sets being secured to the composite panels.

It should be noted that, if desired, only a portion of the methods 100, 200, 300, 400, 500, 600 of forming the logistics panels 174, 274, 374, 474, 574, 674 need be performed prior to the connection of the logistics panels 174, 274, 374, 474, 574, 674 to one another with the joint construction 35, and prior to the connection of the logistics panels 174, 274, 374, 474, 574, 674 to both the top and bottom rails 29, 30. For example, FIGS. 32 and 33 illustrate the logistics panels 174 being secured to one another by the joint construction 35 prior to the logistics and splicing plates 150, 158 being secured thereto. FIG. 34 then shows the logistics panels 174 secured to the top and bottom rails 29, 30 prior to the logistics and splicing plates 150, 158 being secured thereto. FIG. 35 then shows the logistics plates 150 being secured to the logistics panels 174 prior to the splicing plates 158 being secured thereto. It is again to be understood that the steps taken in forming the sidewall 22 of the trailer 20 can be performed in any logical order, e.g., formation of the logistics plates 174, 274, 374, 474, 574, 674 need not be completed as described hereinabove prior to securing same to one another with the joint construction 35 or to the top and bottom rails 29, 30. In other words, the order in which the steps are performed to form the sidewall 22 as described hereinabove can be altered whenever feasible so long as the sidewall 22 of the trailer 20 is formed as desired.

With the sidewall 22 of the trailer 20 thus formed, logistics apertures 41 are provided at the joining of adjacent logistics panels 174, 274, 374, 474, 574, 674 by the joint constructions 35, and one or more sets of logistics apertures 155, 555 are provided between the logistics apertures 41. The logistics apertures 41, 155, 555 are accessible through the interior of the trailer 20 in order to allow for the engagement of equipment, such as clips or hooks, to the logistics plates 36, 150, 550. As explained hereinabove, the logistics apertures 155, 555 are preferably smaller than the aperture(s) 149 provided through the composite panels 31 because it is preferable for the equipment to only engage the logistics plates 150, 550, and not the inner or outer skins 33, 34 or the core member 32 of the composite panels 31, as the engagement of the equipment with any portion of the composite panels 31 could possibly harm or damage the integrity of the composite panels 31. It should be noted, however, that the size of the logistics apertures 155, 555 through the logistics plate 150, 550 could be equivalent to the aperture(s) 149 through the composite panels 31 such that the equipment could be engaged with any one of the inner and outer skins 33, 34 or the core member 32 of the composite panels 31. It should further be noted that while the logistics apertures 155, 555 provided through the composite panels 31 are illustrated as being rectangular in configuration, other configurations of the logistics apertures 155, 555 may be utilized as desired, for instance, the apertures 155, 555 could be circular in configuration. The configuration of the aperture(s) 149 through the composite panels 31 can also be altered as desired. The configuration of the logistics apertures 155, 555 and the aperture(s) 149 is primarily dependent on the equipment to be engaged with the logistics plate 150, 550.

It is noted that in each of the logistics panels 174, 274, 374, 474, 574, 674, the splicing plate 158 is described and illustrated as having an intermediate bulging portion 163. The intermediate bulging portion 163 is provided in order to provide more space or distance between the splicing plate 158 and the logistics apertures 155, 555 of the logistics plates 150, 550 for the engagement of the equipment to the logistics plates 150, 550. It has been determined that a minimum distance of approximately 0.30 inches between the exterior surface 157, 557 of the logistics plate 150, 550, where the logistics apertures 155, 555 are provided, and the interior surface 168 of the splicing plate 158 is typically needed to allow for the proper engagement of the equipment to the logistics plates 150, 550. In each instance where the intermediate bulging portion 163 is provided on the splicing plate 158, the exact configuration of the bulging portion 163 may be altered to ensure this distance is achieved.

Figure 36:
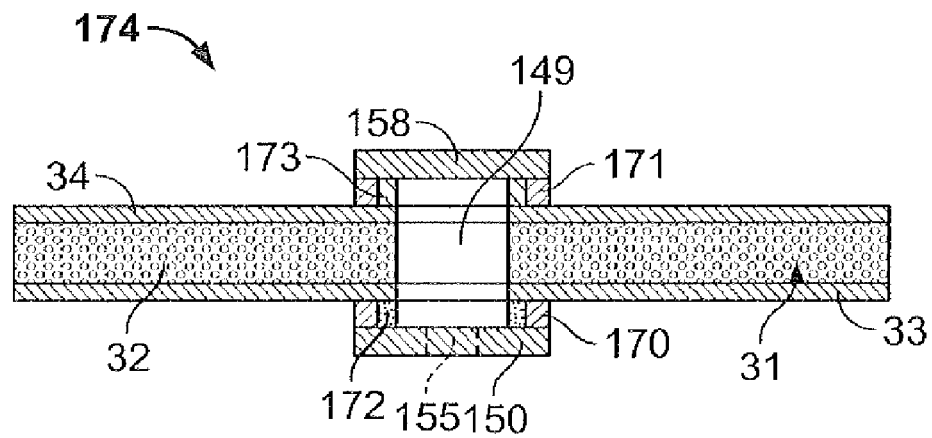
FIG. 36 illustrates the logistics panel of FIG. 15 formed in accordance with the first embodiment of the method of the invention, but with an alternative configuration of the splicing plate.
Figure 37:
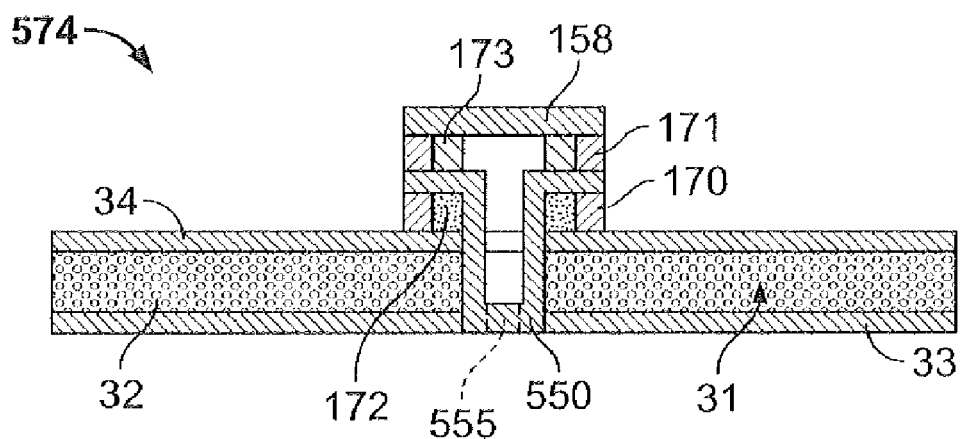
FIG. 37 illustrates the logistics panel of FIG. 24 formed in accordance with the fifth embodiment of the method of the invention, but with an alternative configuration of the splicing plate.

Because of the thickness of the layer of tape 170 and adhesive 172 (about 0.010 inches) and due to the thickness of the layer of tape 171 and adhesive 173 (about 0.010 inches), it is not necessary in either of the logistics panels 174, 574 to provide the splicing plate 158 with the intermediate bulging portion 163 as the distance between the exterior surface 157, 557 of the logistics plate 150, 550, where the logistics apertures 155, 555 are provided, and the interior surface 168 of the splicing plate 158 is approximately 0.315 inches. Thus, in connection with the logistics panels 174, 574, the splicing plate 158 may be a flat piece like the logistics plate 150, as illustrated in FIGS. 36 and 37. This is beneficial for a number of reasons, including that it provides the exterior surface of the sidewall 22 of the trailer 20 with a sleeker, smoother finish and also allows for the exterior surface of the sidewall 22 of the trailer 20 to be painted easier.

Of course, if desired, other modifications could be made to the thicknesses of the parts of the other logistics panels 274, 374, 474, 674 in order to make the splicing plate 158 thereof also be a flat piece like the logistics plate 150 as opposed to including the intermediate bulging portion 163.

Figure 38:
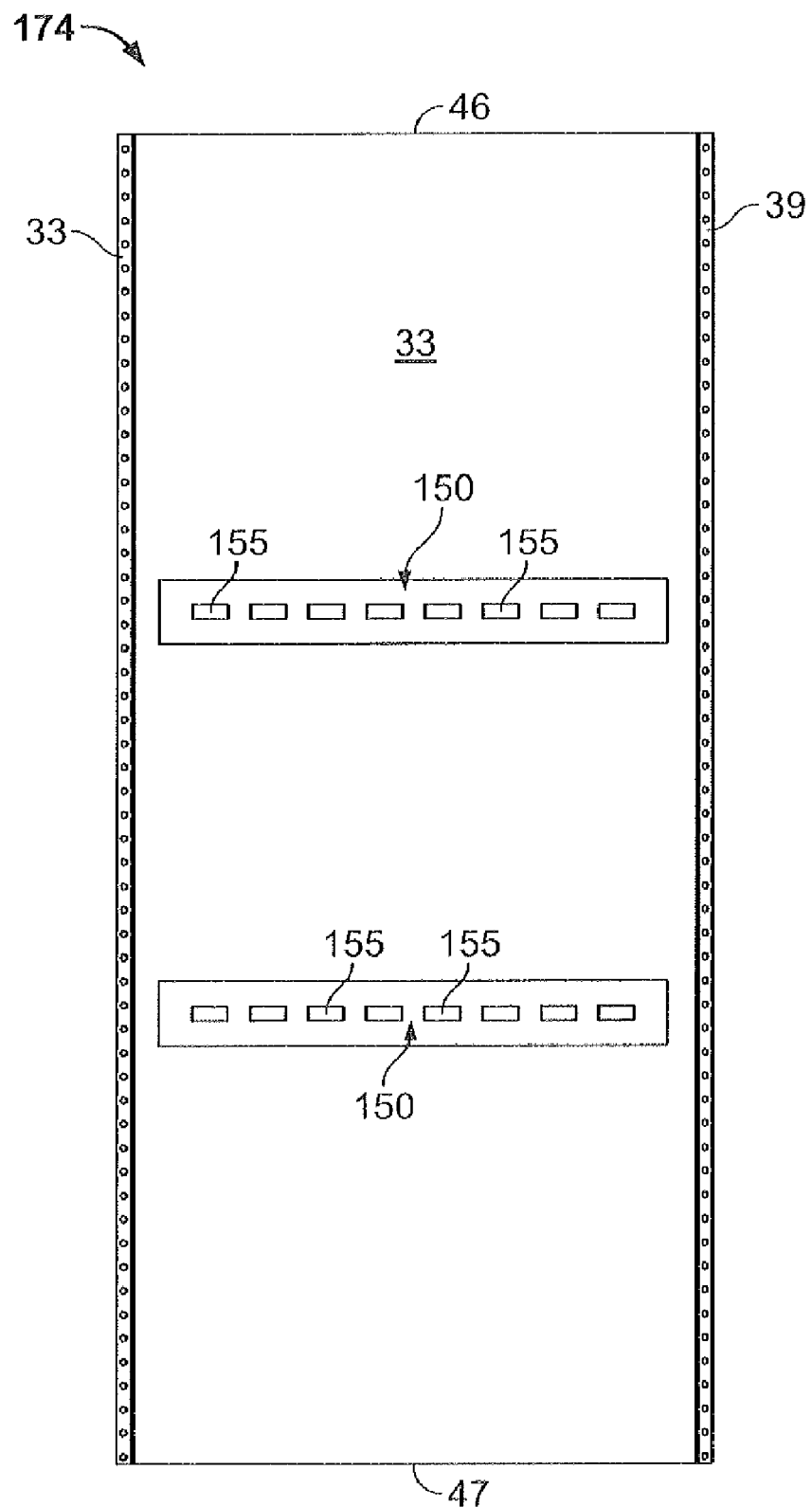
FIG. 38 illustrates an alternative configuration of the logistics panels formed in accordance with methods of the invention.

It is also noted that in each of the logistics panels 174, 274, 374, 474, 574, 674 described and illustrated, that the logistics plates 150, 550 and the splicing plates 158 are provided in a vertical manner on the sidewall 22 of the trailer 20, e.g., generally running from proximate the bottom rail 30 straight upwardly to proximate the top rail 29. If desired, the layout of the logistics plate 150, 550 and the splicing plates 158 could be changed to be horizontal, as illustrated in FIG. 38, or even diagonal, if desired.

It should be noted that while it is discussed in each of the embodiments that tapes 170, 171 are provided, that the tapes 170, 171 do not need to be provided, if desired. The tapes 170, 171 are primarily provided to act as a dam to stop or substantially prevent the bonding adhesives 172, 173 from running/flowing outside of the exterior perimeters of the logistics plates 150, 550 and the splicing plates 550, but it is not necessary to prevent the adhesives 172, 173 from running/flowing or the run/flow of the adhesives 172, 173 could be controlled by other means, for instance, the amount of adhesives 172, 173 used, the placement of the adhesives 172, 173, etc. Thus, methods 100, 200 may be performed without step 105 and/or without step 106; methods 300, 400 may be performed without step 305 and/or without step 106; and methods 500, 600 may be performed without step 505 and/or without step 106.

It should further be noted that while adhesives 172, 173 are described and illustrated herein as securing the logistics plates 150, 550 and the splicing plates 158 to the composite panels 31 or to one another, that it is to be understood that the logistics plates 150, 550 and the splicing plates 158 could alternatively be joined to the composite panels 31 or to one another by a fasteners (not shown), such as a rivet, in a manner which is well-known in the art, as fasteners and the adhesives 172, 173 are considered to be equivalents in this invention (as they are both intended to permanently secure the logistics plates 150, 550, the splicing plates 158 and the composite panels 31 together). Of course, unless further alterations were made to the logistics panels 174, 574, these panels 174, 574 would then preferably need to have a splicing plate 158 formed with the intermediate bulging portion 163 in order to ensure that the proper amount of space is provided (as the extra space of 0.020 inches provided by the adhesives 172, 173 would no longer be provided) to allow for the engagement of equipment with the logistics plates 150, 550. Also, if desired, the adhesives 172, 173 could be utilized in conjunction with fasteners.

It should also be noted that, if desired, in connection with the formation of the logistics panels 374, 474, 574, 674, the logistics plates 150, 550 and the splicing plate 158 could be integrally formed if desired, thus removing the necessity for securing the logistics panels 150, 550 and the splicing plate 158 together using the tape 171 and the bonding adhesive 173 (or any other type of fasteners as discussed hereinabove).

Further, it should be noted that, if desired, in connection with the logistics panels 374, 474, 574, 674, the splicing panel 158 may be configured in a manner to enlarge the flat side end portions 161, 162 such that the tape 171 and the bonding adhesive 173 could be used to secure the splicing panel 158 to the outer skin 34 of the composite panel 31, rather than to the logistics panels 150, 550, in generally the same manner in which the splicing panel 158 is secured to the outer skin 34 of the composite panel 31 in connection with the logistics panels 174, 274.

The invention thus provides methods 100, 200, 300, 400, 500, 600 of forming logistics panels 174, 274, 374, 474, 574, 674 for use in forming a sidewall 22 of a trailer 20. The sidewall 22 would have logistics slots provided at shorter intervals, for example, sixteen to seventeen inch intervals or twenty-four to twenty-five inch intervals, than those sidewalls of a trailer where logistics slots are provided only at the joint configurations 35 which join adjacent composite panels 31 together, which provides logistics slots at intervals of, for example, forty-eight to fifty inches. The methods 100, 200, 300, 400, 500, 600 allow for a simplified and more efficient manufacturing process comparative to the prior art method as it is unnecessary to make and/or stock composite panels of varying widths. Thus, manpower personnel and/or hours is saved in forming the trailers 20; less scrap is created during formation, increased profit is realized and less material is utilized. The trailers 20 also are lighter in weight comparative to prior art trailers, have improved aesthetics, and retain all of the benefits realized by the prior art trailers. Also, the logistics plates 150, 550 will not hold the portion or baserail 44 of the bottom rail 30 out from the sidewalls 22 as will occur with the sidewalls of the prior art trailers at every connection of the reduced width adjacent composite panels 31.

It should further be noted that while the invention is described with regard to the type of trailer 20 described and illustrated herein, that the invention could also be utilized with other types of trailers or trucks or the like, where logistics apertures are required for engagement of equipment. The invention may also be utilized in trailers having a high baserail, which extends further upwardly from the floor 26 than does the bottom rail 30 of the trailer 20. Such a sidewall of a trailer is described and illustrated in U.S. Pat. No. 7,114,762, issued Oct. 3, 2006 and entitled "Sidewall Of A Semi-Trailer Having A High Baserail", the invention of which is assigned to the assignee of the present invention, and which is hereby incorporated by reference in its entirety. In such a sidewall, the logistics plate 150, 550 and the splicing plate 158 would extend to a position above where a top end of the high baserail is provided, similar to how the logistics plate 150, 550 and the splicing plate 158 extend to a position above where the portion 44 of the bottom rail 30 is provided.

While preferred embodiments of the present invention are shown and described, it is envisioned that those skilled in the art may devise various modifications of the present invention without departing from the spirit and scope of the foregoing description, the attached drawings and the appended claims.

What is claimed is:

1. A sidewall of a trailer comprising:
   first and second panels, each panel having inner and outer skins and a core member secured therebetween, top and bottom end portions, first and second side end portions, and at least one aperture extending through the inner and outer skins and the core member and between the end portions; and
   a wall panel joining structure coupled to the first side end portion of the first panel and the second side end portion of the second panel in order to couple the first and second panels together,
   wherein the at least one aperture of each panel is spaced-apart from the wall panel joining structure.

2. The sidewall of claim 1, wherein each panel further comprises a logistics plate having at least one logistics aperture provided therethrough, the logistics plate being secured to the panel such that the at least one logistics aperture is in alignment with the at least one aperture such that the at least one aperture is accessible through the logistics plate.

3. The sidewall of claim 1, wherein each panel further comprises a splicing plate positioned to cover the at least one aperture such that the at least one aperture is inaccessible through the splicing plate.

4. The sidewall of claim 1, further comprising top and bottom rails, the top end portions of the first and second panels being secured to the top rail, the bottom end portions of the first and second panels being secured to the bottom rail.

5. The sidewall of claim 1, wherein the wall panel joining structure includes (i) a logistics member having a top end generally aligned with the top end portions of the first and second panels and a bottom end generally aligned with the bottom end portions of the first and second panels, and a splicing member having a top end generally aligned with the top end portions of the first and second panels and a bottom end generally aligned with the bottom end portions of the first and second panels.

6. The sidewall of claim 1, wherein each of the first and second panels further defines (i) a first side end aperture which extends through the first side end portion, and (ii) a second side end aperture which extends through the second side end portion.

7. The sidewall of claim 6, wherein the at least one aperture which extends through the inner and outer skins and the core member of each of the first and second panels is positioned between and spaced laterally from each of the first and second side end apertures formed in the respective side end portions of each of the respective first and second panels.

8. The sidewall of claim 1, wherein the at least one aperture is elongated.

9. The sidewall of claim 8, wherein the at least one aperture is vertically-elongated such that the at least one aperture extends generally vertically downwardly from a position below the top end portion of each of the first and second composite panels to a position above the bottom end portion of each respective panel.

10. The sidewall panel of claim 8, wherein the at least one aperture is horizontally-elongated such that the at least one aperture extends generally horizontally from a position proximate the first end portion of each respective panel to a position proximate the second end portion of each respective panel.

11. The sidewall of claim 1, wherein the at least one aperture is provided generally equidistantly between the first and second side end portions of each of the first and second panels.

12. The sidewall panel of claim 1, wherein the at least one aperture includes first and second apertures.

13. The sidewall panel of claim 12, wherein the first aperture is provided generally one-third of the way between the first and second side end portions of each respective panel, and wherein the second aperture is provided generally two-thirds of the way between the first and second side end portions of each respective panel.

* * * * *